United States Patent
Foes

[19]
[11] Patent Number: 5,967,729
[45] Date of Patent: Oct. 19, 1999

[54] BOTTOM DISCHARGE, ROTATING RING DRIVE SILO UNLOADER

[75] Inventor: Gordon F. Foes, Fort Atkinson, Wis.

[73] Assignee: J-Star Industries, Inc., Fort Atkinson, Wis.

[21] Appl. No.: 08/997,128

[22] Filed: Dec. 23, 1997

Related U.S. Application Data

[60] Provisional application No. 60/035,572, Jan. 14, 1997.

[51] Int. Cl.$^6$ ................................................ B65G 65/38
[52] U.S. Cl. ........................ 414/317; 414/297; 414/319; 414/326
[58] Field of Search ..................... 414/297, 298, 414/302, 313, 317, 318, 319, 321, 325, 326

[56] References Cited

U.S. PATENT DOCUMENTS

| | | |
|---|---|---|
| 2,580,306 | 12/1951 | Leach et al. |
| 2,941,677 | 6/1960 | Korber ................................... 414/325 |
| 2,963,327 | 12/1960 | Seymour et al. |
| 3,075,657 | 1/1963 | Hazen ................................ 414/317 X |
| 3,512,661 | 5/1970 | Slieter . |
| 3,713,551 | 1/1973 | Moen ..................................... 414/298 |
| 3,794,190 | 2/1974 | Lambert, Jr. ........................ 414/298 X |
| 3,908,840 | 9/1975 | Lambert, Jr. ........................ 414/298 X |
| 3,912,090 | 10/1975 | Pondell .................................. 414/318 |
| 4,022,335 | 5/1977 | Lambert, Jr. ........................ 414/302 X |
| 4,227,836 | 10/1980 | Sizelove et al. .................... 414/313 X |
| 4,243,352 | 1/1981 | Sizelove et al. ........................ 414/313 |
| 4,465,418 | 8/1984 | Norton ................................... 414/313 |
| 4,721,425 | 1/1988 | Strӧcker ................................ 414/298 |
| 5,112,180 | 5/1992 | Hough ............................... 414/317 X |
| 5,642,977 | 7/1997 | Hanson et al. ..................... 414/313 X |

FOREIGN PATENT DOCUMENTS

| | | | |
|---|---|---|---|
| 7802758 | 10/1979 | Sweden ................................. | 414/298 |
| 1044970 | 10/1966 | United Kingdom .................. | 414/298 |

OTHER PUBLICATIONS

Van Dusen & Company, Inc., Wayzata, MN, The Ring Unloader for Strength and Stability, Brochure Form No. SM679 (1979).

(List continued on next page.)

*Primary Examiner*—James W Keenan
*Attorney, Agent, or Firm*—Godfrey & Kahn, S.C.

[57] ABSTRACT

This invention relates to a top loading, top unloading bottom discharge, ring drive silo unloader that is adapted for use with a hexapod suspension. The unloader features a stationary support frame with an open center concept. The support frame includes three main support members joined together to form a triangular frame. Three bracing members are added to the support frame to form an interior perimeter with a generally hexagon shape that delineates the open central area. A rotating drive ring is suspended from the support frame. An electric motor drives a chain loop that engages the exterior surface of the drive ring and causes it to rotate. A gathering mechanism that includes a subframe with a telescoping tubular support is suspended from the rotating drive ring. An auger is suspended from the tubular support. The telescoping tubular support is designed to permit installation adjustment so that the silo unloader can fit into a range of silo diameters and accommodate warpage in the round shape of the silo wall. The tubular support and auger are pitched at an angle of about six degrees to facilitate the distribution and gathering of silage across the top layer of the silage. The auger is driven by an electric motor having a drive shaft in line with the auger shaft. Power is supplied to the auger motor via a collector ring. The collector ring is mounted on a tower extending from the tubular support. A double pivoting wall wheel is secured to the end of the tubular support. A hole former is also secured to the tubular support and can be automatically power driven from a central loading position to a offset storage or unloading position. An on-board winch assembly may also be provided to raise and lower the silo unloader.

40 Claims, 14 Drawing Sheets

OTHER PUBLICATIONS

Jamesway, a Division of J–Star Industries, Inc., Fort Atkinson, WI, Big Jim® B.U.C.S. Bottom Unloader Conversion System, Brochure F3354 20M/W/3/94 (1994).

Jamesway, a Division of J–Star Industries, Inc., Big Jim® Silage Handling System, Brochure F2780C 1191/5M/W (1991).

Jamesway, a Division of J–Star Industries, Inc., Fort Atkinson, WI, Big Jim® B.U.C.S. Bottom Unloading Conversion System, F3394 (1994).

Hanson Silo Company, Lake Lillian, MN, Maxx–Trac High Capacity Ring Drive Unloader/Distributor, Brochure.

Hanson Silo Company, Lake Lillian, MN; Nothing Beats the TRACS, Brochure.

Hanson Silo Company, Lake Lillian, MN; Hanson Uni–Trac Silage Handling for Tomorrow . . . Today!, Brochure.

Hanson Silo Company, Lake Lillian, MN; Hanson Posi–Trac Ring Drive Unloader, Brochure.

Hanson Silo Company, Lake Lillian, MN; Hanson Super–Trac Ring Drive Unloader, Brochure.

Hanson Silo Company, Lake Lillian, MN, Super–Trac Featuring—Turbo O Blowers and Heavy–Duty Augers, Brochure.

Hanson Silo Company, Lake Lillian, MN, "Uni–Trac" Ring Drive Silo Unloader, Owner's Manual (Sep. 1993) pp. 50–52 and 59.

Badger Northland Inc., Kaukauna, WI, Frostbuster Silo Unloaders, Brochure (Apr. 1989).

Van Dale® Division of J–Star Industries, Inc., Fort Atkinson, WI, Ring Drive Silo Unloader, Brochure F3605 (Nov. 1997).

Van Dale® Division of J–Star Industries, Inc., Fort Atkinson, WI, Center Drives, Brochure F3326 (Jul. 1993).

Van Dale® Division of J–Star Industries, Inc., Fort Atkinson, WI Surface Drives, Brochure F3325 (Jul. 1993).

Van Dale® Division of J–Star Industries, Inc., Fort Atkinson, WI, Magnum II Surface Drive Silo Unloader, Brochure F3392 (Sep. 1995).

Dyna–Matic Feeding Systems, Inc., Plymouth, MN, Dyna–Matic Feeding Systems, Brochure.

ValMetal Inc., Québec, Canada, Valmetal Model 2000, Brochure.

Starline® a Division of J–Star Industries, Inc., Starline® Power Pack™ Surface Drive Silo Unloader, Brochure F3052B.

Dyna–Matic Feeding Systems, Inc., Plymouth, MN, Gemini R/D, Brochure.

Dyna–Matic Feeding Systems, Inc., Plymouth, MN, Silo–Matic® R–26 Pacesetter, Brochure.

Butler Manufacturing Company, Jamesway Division of J–Star Industries, Inc., Fort Atkinson, WI, Jamesway® Silage Distributor–Unloaders, Brochure F2513A (1979).

J–Star Industries, Inc., Fort Atkinson, WI, Volumaxx™ High–Capacity Silo Unloader, Brochure F3219 (1991).

Jamesway Co. Limited, Cambridge, Ontario, Jamesway® Volumatic® Silo Unloader, Brochure.

J–Star Industries, Inc., Fort Atkinson, WI, Big Jim® Quantum™ System, Brochure F3620 (1997).

Patz Sales, Inc., Pound, WI, Patz® Model 8820 Ring–Drive Silo Unloader, Brochure.

Patz Sales, Inc., Pound, WI, Feed Handling Systems, Brochure PA–3473 (1990).

Butler Manufacturing Company, Fort atkinson, WI, Volumaster™ Silage Distributor–Unloader Service Parts, Brochure F2773 (1984).

Butler Manufacturing Company, Fort Atkinson, WI, Volumaster™ Silage Distributor–Unloader Installation Instructions and Operator's Manual, Brochure F2772 (1984).

J–Star Industries, Inc., Fort Atkinson, WI, Single Cable Volumaster™ Unloader Volumaster™ and Silage Distributor–Unloader Model No. 200620–9 Service Parts, Brochure F2773B (1988).

J–Star Industries, Inc., Fort Atkinson, WI, Volumaster Silage Distributor Unloader Model No. 200620–9 Installation Instructions and Operator's Manual, Brochure F2772B (1989).

ValMetal Inc., Québec, Canada, Model 880 Silage Distributor—Unloader, Operator's Manual (1988).

ValMetal Inc., Québec, Canada, Silo Unloader 880 Model Electrical Installation Instructions, Instruction Manual.

ValMetal Inc., Québec, Canada, Silo Unloader Model 880 Service Parts, Brochure (1994).

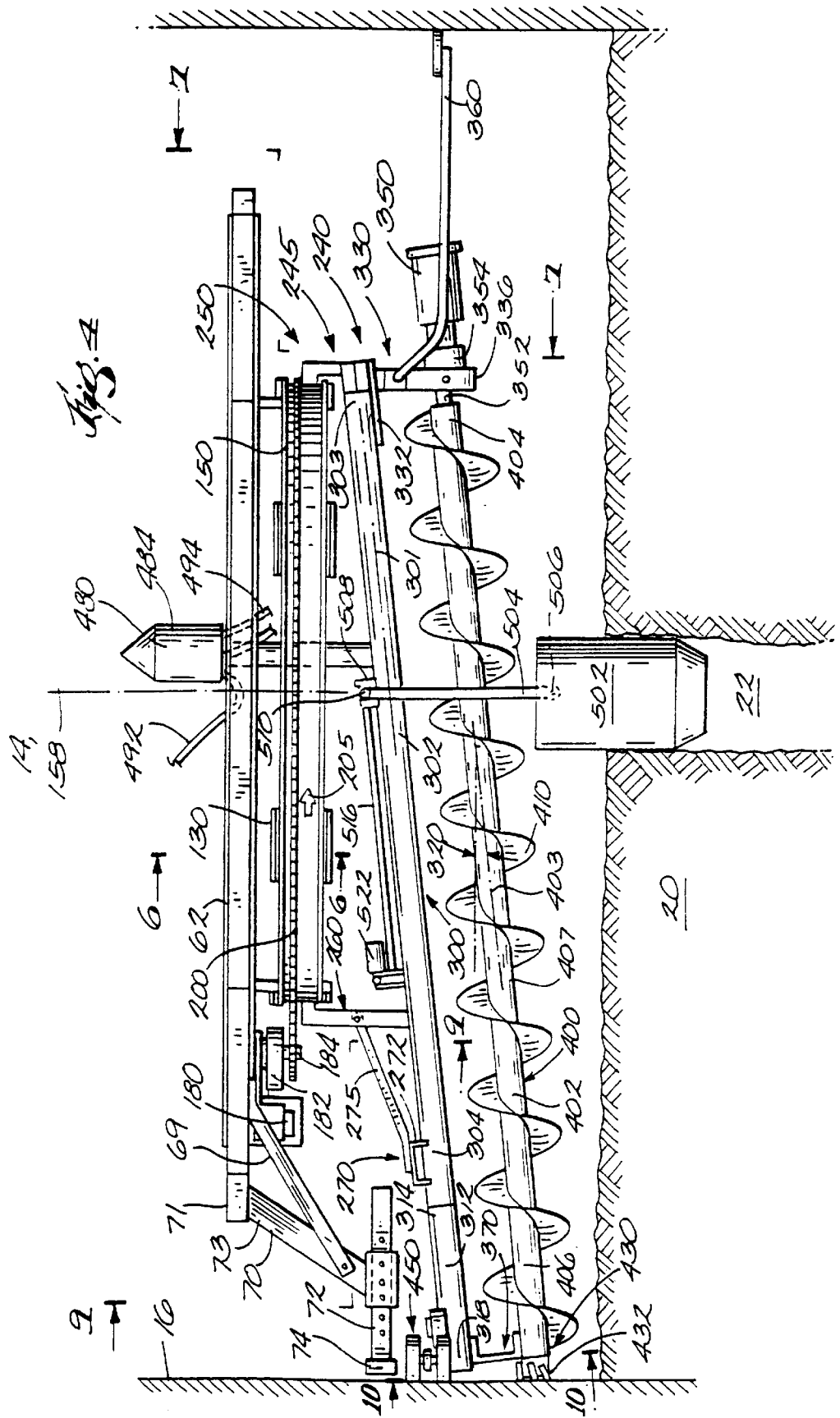

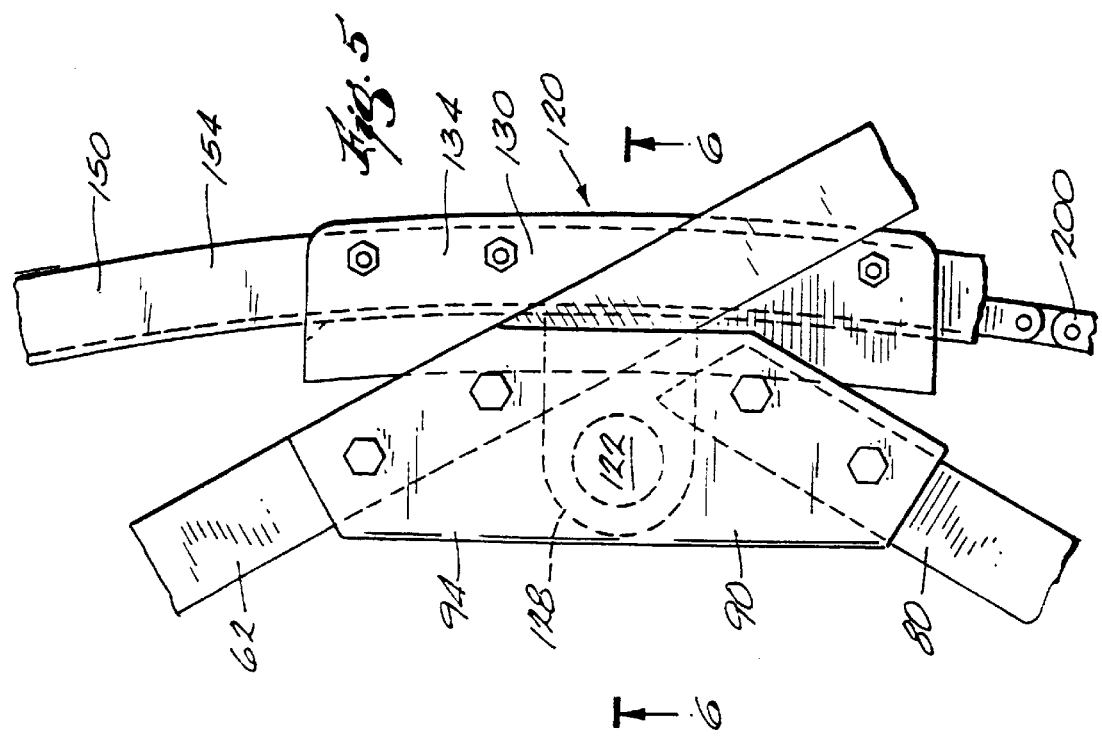
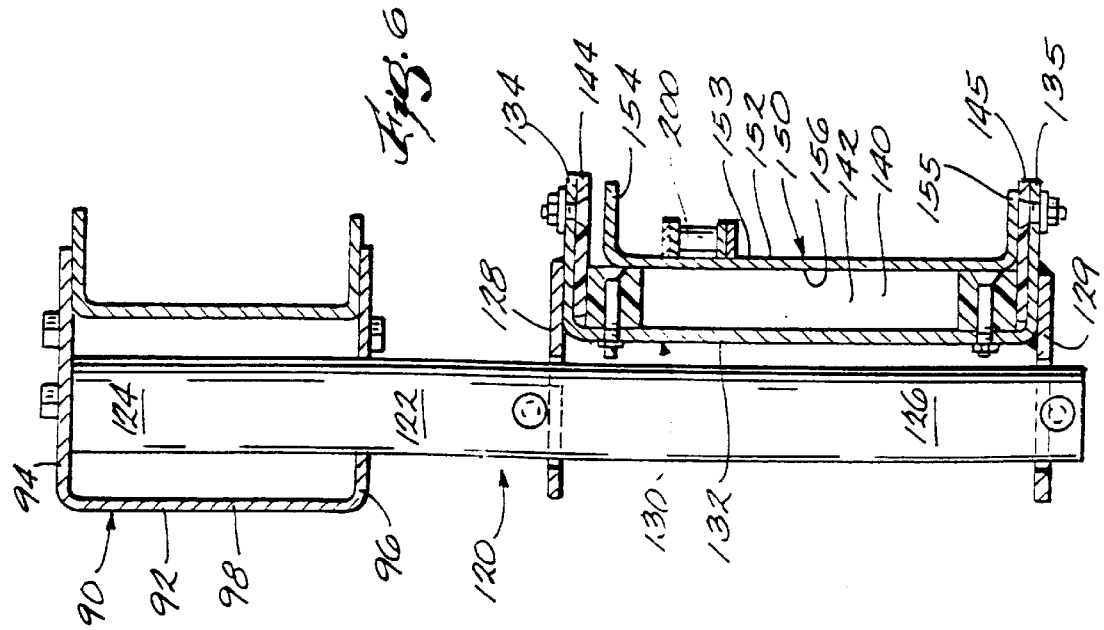

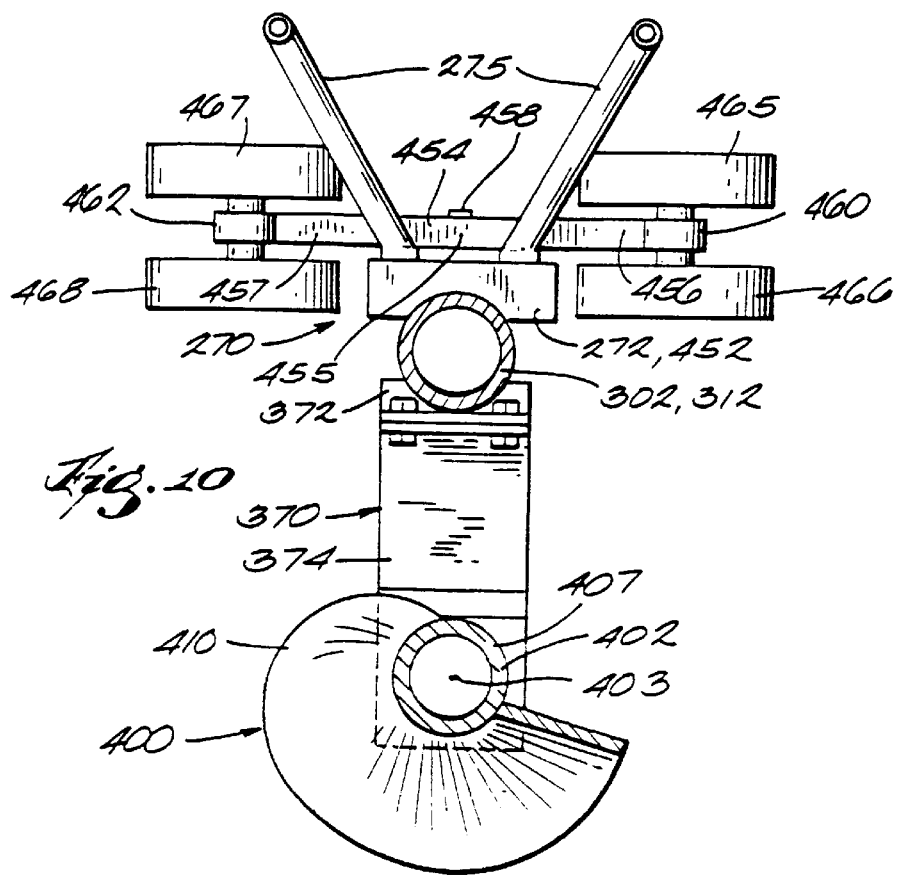
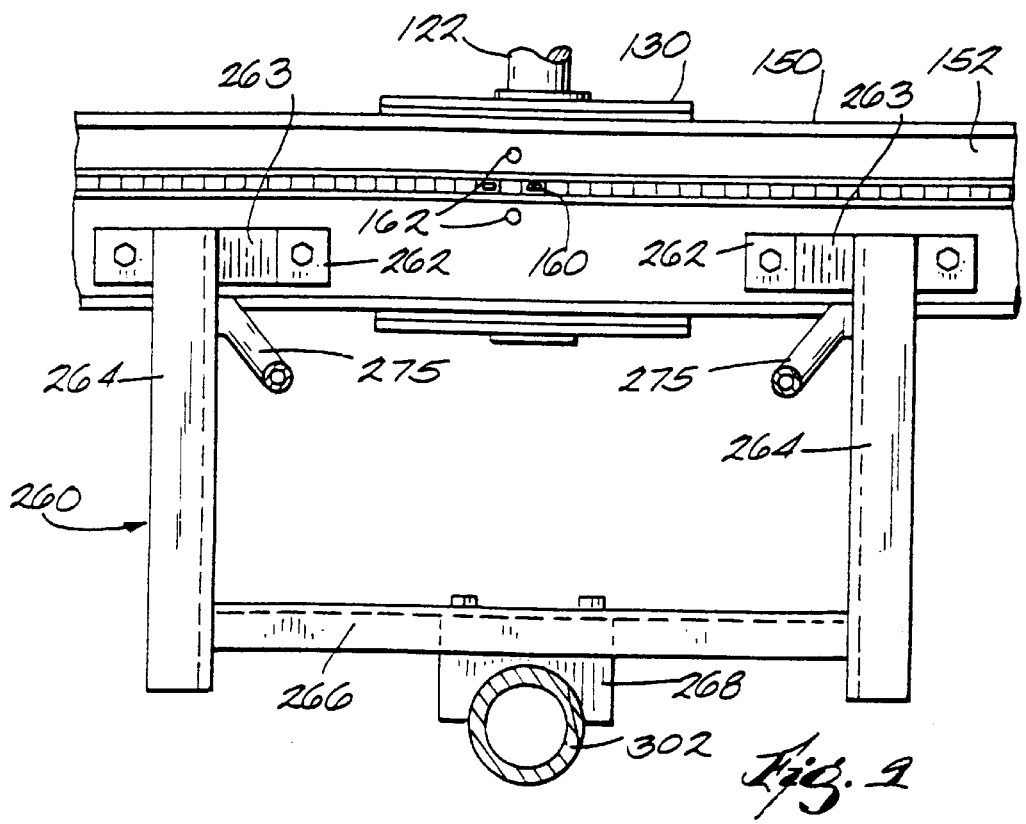

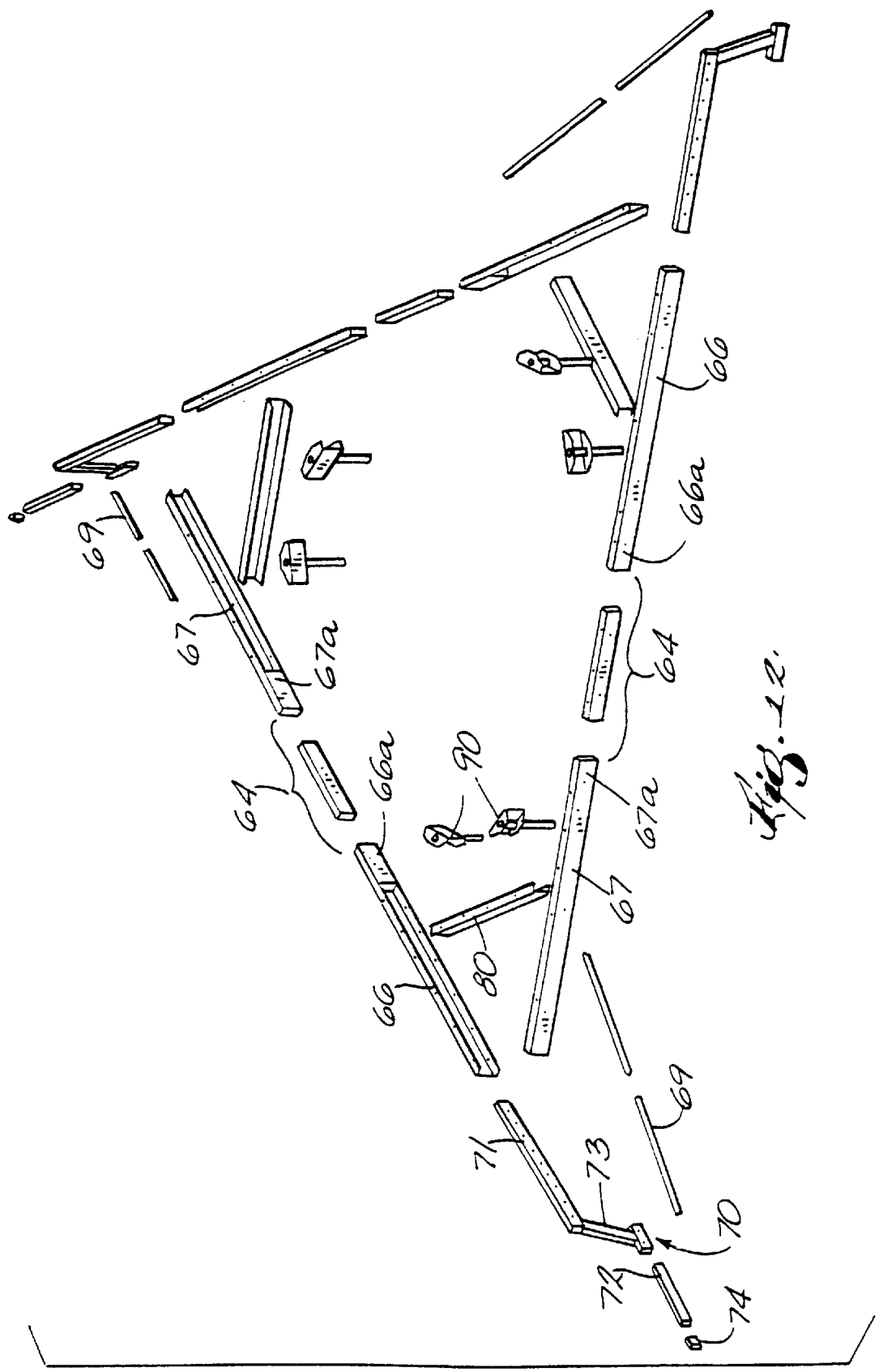

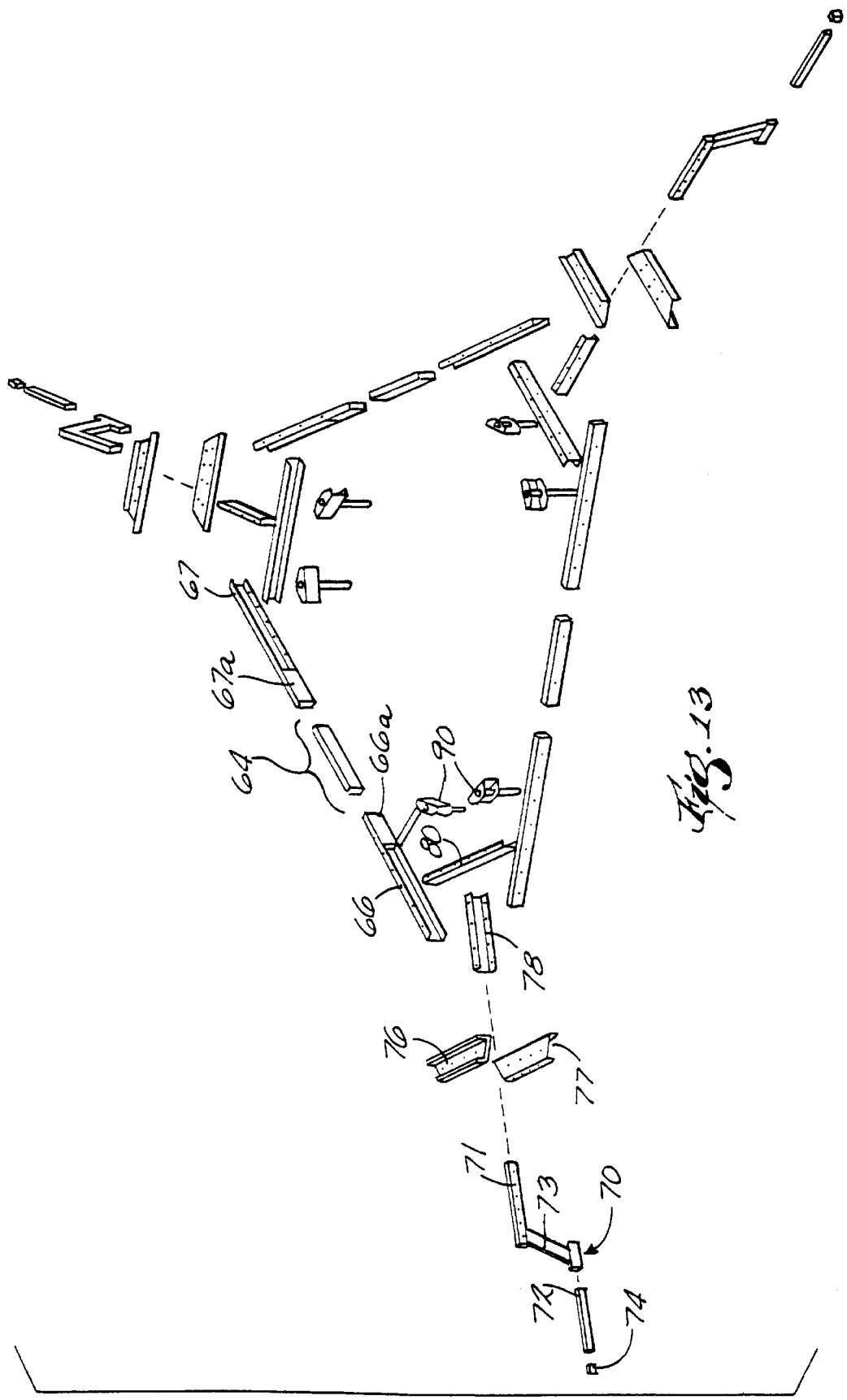

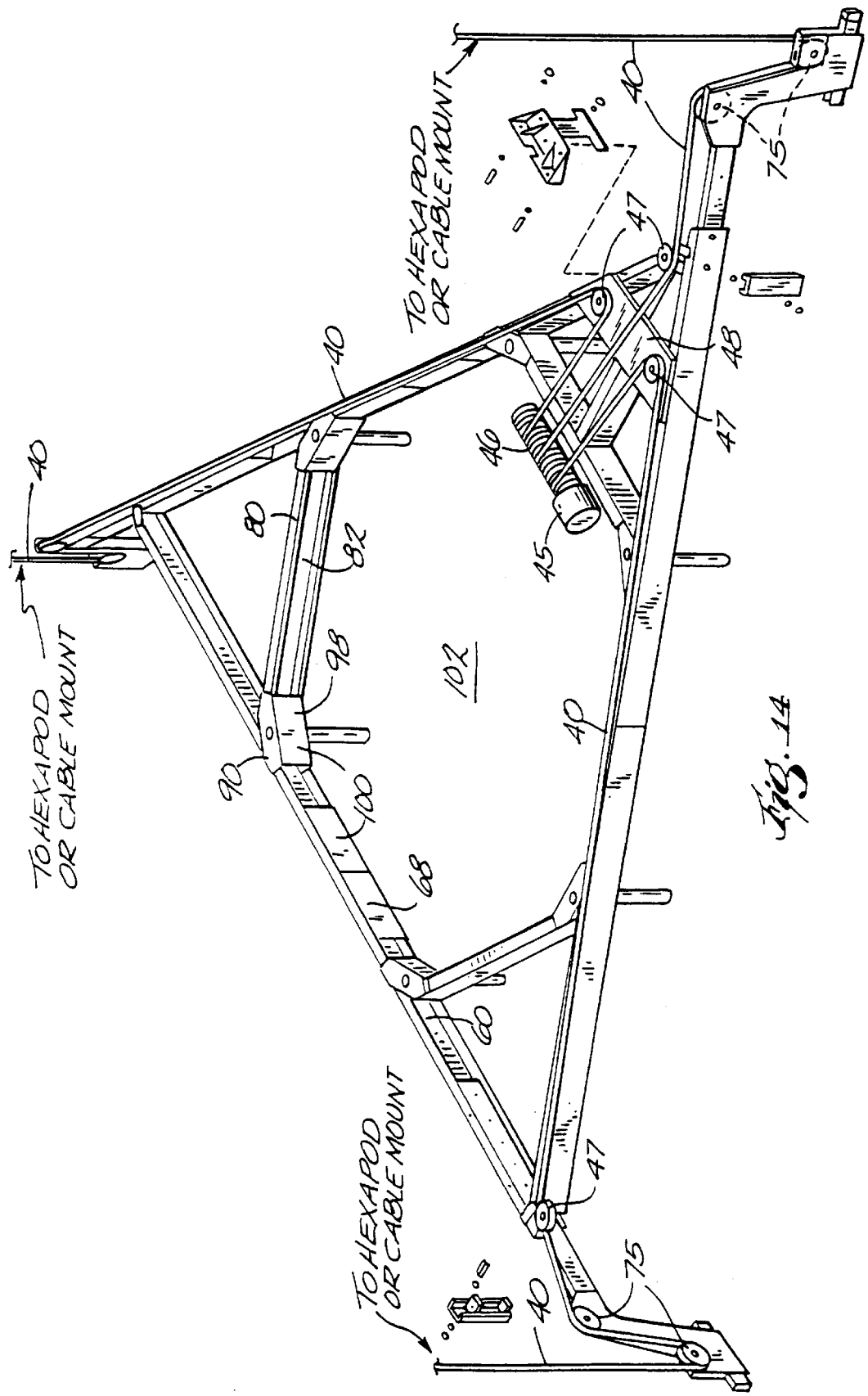

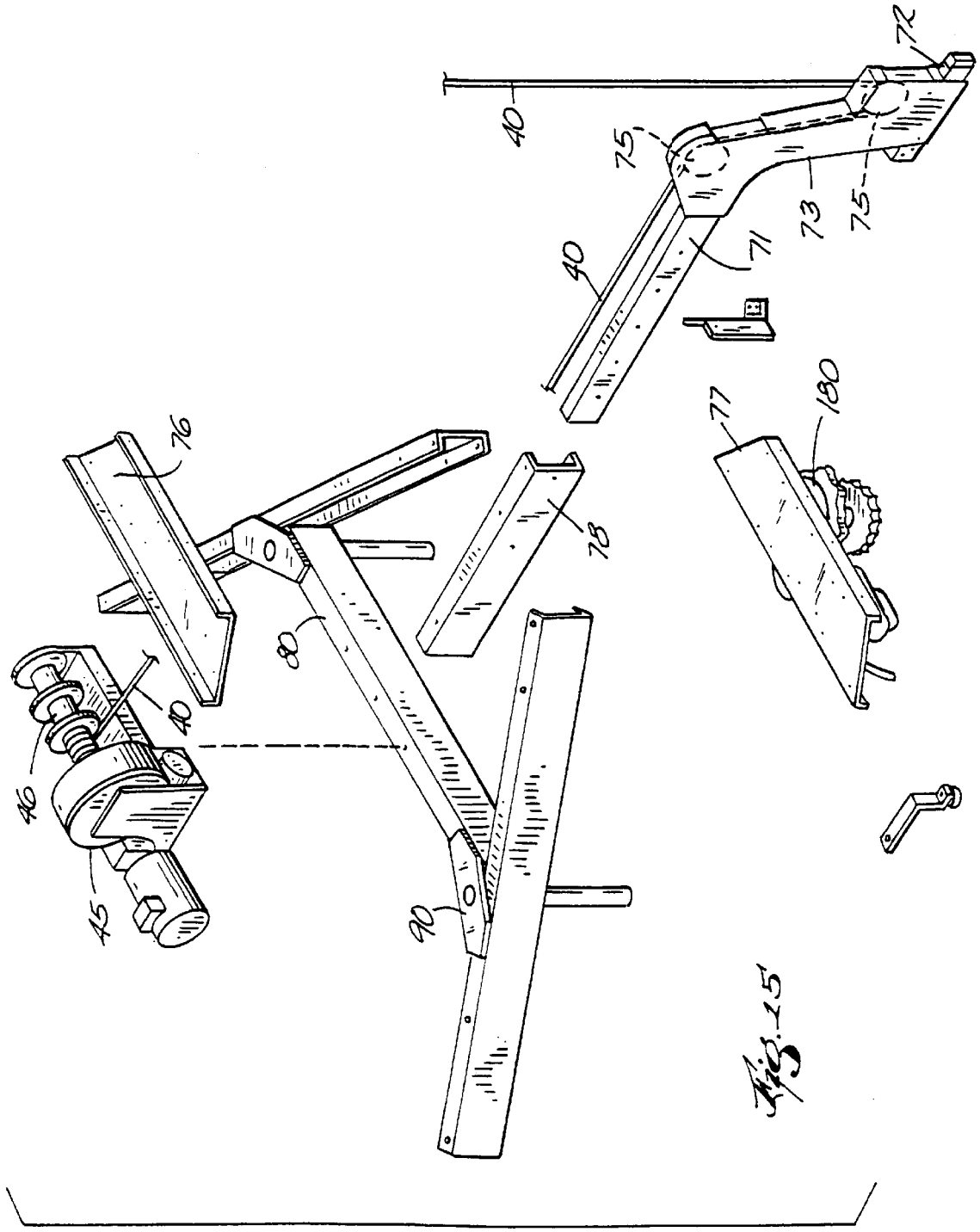

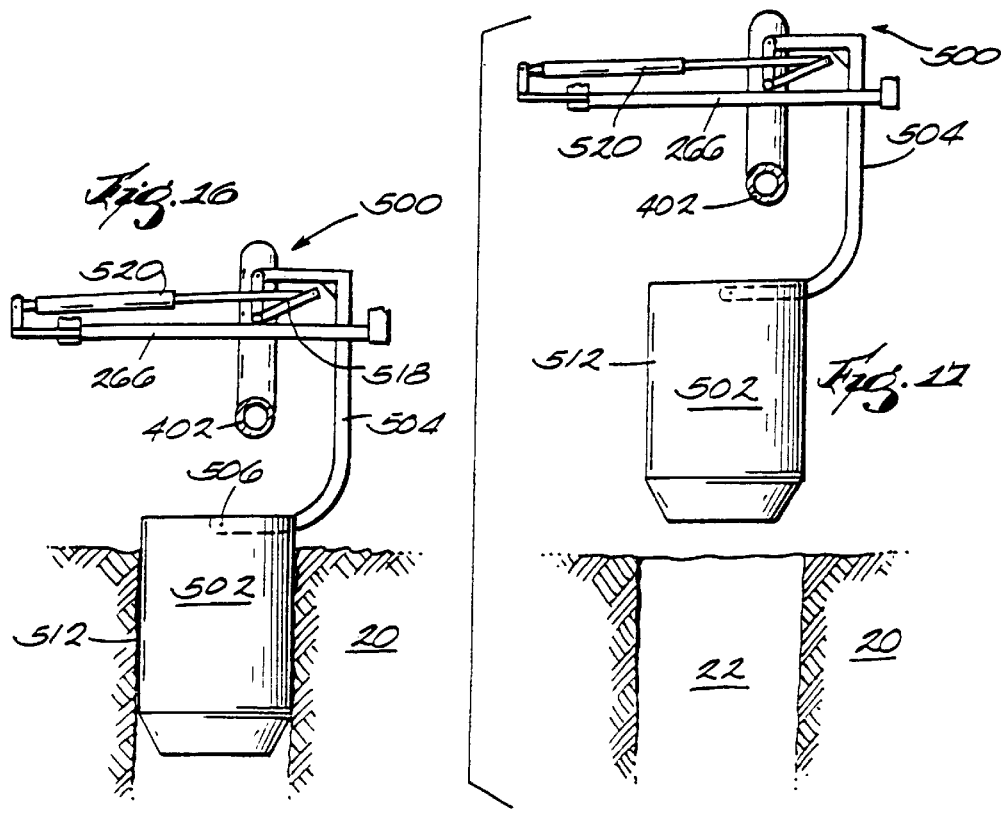
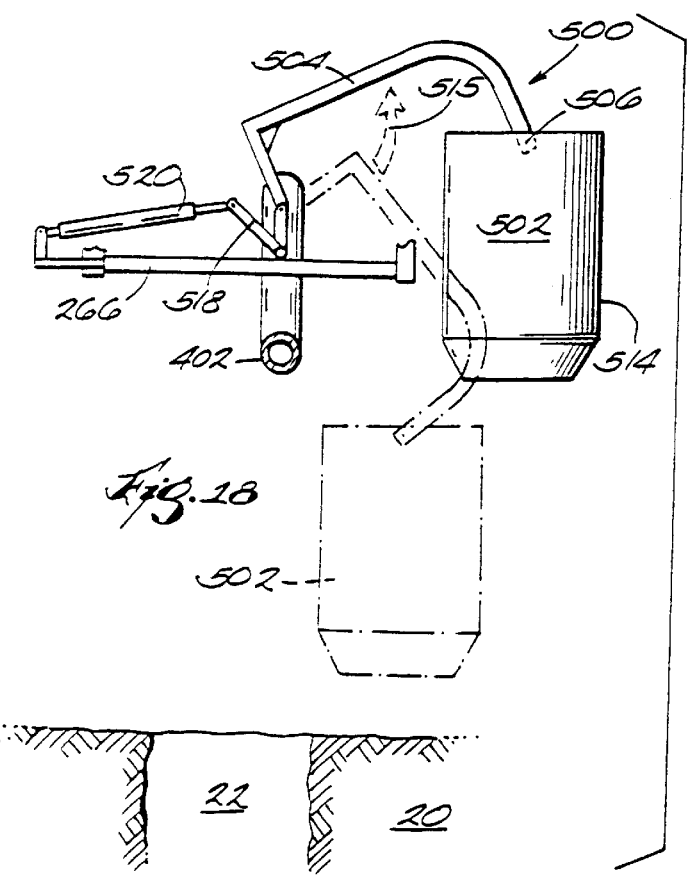

BOTTOM DISCHARGE, ROTATING RING DRIVE SILO UNLOADER

This application claims benefit of Provisional Application Ser. No. 60/035,572 filed Jan. 14, 1997.

TECHNICAL FIELD

This invention relates to a ring drive silo unloader for top loading, and top unloading bottom discharge applications.

BACKGROUND OF THE INVENTION

A main problem with silo unloaders is obtaining even distribution of silage over the top layer of the silo during filling. Silage is not a free-flowing material, and does not move easily from the center to the silo walls. In addition, the silo unloader itself is typically positioned in the center of the silo and interferes with a centrally positioned fill chute. This results in either the fill chute being positioned off center—increasing unevenness of distribution—or the need to fill under the suspended unloader from the side of the silo with a "splitter" pipe, which also gives uneven distribution.

Another problem is that the uneven distributor of silage impacts the stability of the unloader during the loading and unloading process. A greater quantity of silage may be packed into one area due to an uneven distribution or there may be an uneven distribution in the moisture content of the silage during the filing process. One side of the silo may also be exposed to more freezing and thawing which can affect the density of the silage in that area. When the auger encounters dense or hardened silage, the auger may become unstable by bouncing or raising up in the silage so that the auger cuts through the silage in an uneven manner. This poor stability also increases the need for maintenance on the machine.

Ease of operation is also a problem in bottom discharge ring drive silo unloader design. The silo unloader should be easily raised and lowered in the silo and the hole former should be easily centered into the silage opening or removed from the silage opening. The more a farmer has to enter the silo to adjust the operation of the unloader, the greater the safety risk to the farmer.

A further problem is that the silo unloader should be adaptable for use with a conventional hexapod suspension. Unloaders frequently wear out more quickly than their hexapod suspension. Installation costs naturally increase if both an unloader and the hexapod suspension need to be replaced even though the suspension is in good condition.

Manufacturing costs are also of importance in bottom unloading ring drive silo unloader design. Minimization of parts and ease of assembly are important factors to produce a productive cost effective machine.

This invention is intended to solve these and other problems.

SUMMARY OF THE INVENTION

This invention relates to a top loading, top unloading bottom discharge, ring drive silo unloader that is adapted for use with a hexapod suspension. The unloader features a stationary support frame with an open center concept. The support frame includes three main support members joined together to form a triangular frame. Three bracing members are added to the support frame to form an interior perimeter with a generally hexagon shape that delineates the open central area. A rotating drive ring is suspended from the support frame. An electric motor drives a chain loop that engages the exterior surface of the drive ring and causes it to rotate. A gathering mechanism that includes a subframe with a telescoping tubular support is suspended from the rotating drive ring. An auger is suspended from the tubular support. The telescoping tubular support is designed to permit installation adjustment so that the silo unloader can fit into a range of silo diameters and accommodate warpage in the round shape of the silo wall. The tubular support and auger are pitched at an angle of about six degrees to facilitate the distribution and gathering of silage across the top layer of the silage. The auger is driven by an electric motor having a drive shaft in line with the auger shaft. Power is supplied to the auger motor via a collector ring. The collector ring is mounted on a tower extending from the tubular support. A double pivoting wall wheel is secured to the end of the tubular support. A hole former is also secured to the tubular support and can be automatically power driven from a central loading position to a offset storage or unloading position. An on-board winch assembly may also be provided to raise and lower the silo unloader.

A main advantage of the rotating drive ring unloader is its substantially open center area which permits an even flow of silage onto the top layer of silage in the silo. This enables the auger to distribute and gather the silage evenly across the top surface of the silage. The even distribution of silage promotes optimum performance of the silo unloader both during loading and unloading operations. The even distribution also improves the quality of the silage and maximizes the quantity of silage that can be stored in a given silo. The open center area design spreads the stationary support frame outwardly towards the periphery of the drive ring, and eliminates much of the subframe or auger support framework below the open central areas of the stationary support frame. Many components of the support frame, drive ring and subframe that would otherwise be in the path of travel of the silage during filling are omitted or replaced by the single telescoping tubular support.

Another advantage of the rotating ring drive silo unloader is that the telescoping tubular support and auger may be adjusted to fit the exact dimensions of the silo. During installation, a U-bolt may be loosened to permit movement of the auger towards the wall of the silo to accommodate a range of silo diameters and variances in the cylindrical shape of the silo wall.

Another advantage of the rotating ring drive silo unloader is the automation of the hole forming mechanism that moves the hole former into its hole forming position during the filling or loading operation, or into its offset or storage position during the unloading operation. This advantage is significant given the bulkiness of the hole former. The automated hole forming mechanism also provides a means for storing the hole former during the unloading operation.

A further advantage of the rotating ring drive silo unloader is its stability during operation. The rotating ring drive system and open central area concept provides for smooth operation of the machine and reduced maintenance.

A still further advantage of the rotating ring drive silo unloader is its simplicity of design and ease of installation. A minimum number of components are necessary in this design. This reduces both manufacturing costs and installation costs.

A still further advantage of the invention is the double pivoting wall wheel. This design permits smooth operation during the loading and unloading processes and when raising and lowering the unloader in the silo.

A still further advantage of the invention is the on-board winch assembly for raising and lowering the silo unloader to facilitate ease of operation. The on-board winch can be used in a silo with either a rounded or flat roof. The on-board winch is particularly advantageous when installed in a silo with a flat roof. The on-board winch eliminates the need for a hexapod which would have to be mounted above the roof and would detract from the appearance of the silo.

Other aspects and advantages of the invention will become apparent upon making reference to the specification, claims and drawings.

BRIEF DESCRIPTION OF THE DRAWINGS

FIG. 4 is a side plan view of the rotating ring drive silo unloader with the hole former in its central hole forming position.

FIG. 5 is a top view showing a main support member joined to a brace by a coupling, and the drive ring supported from the coupling via a drive ring support.

FIG. 6 is a sectional view of FIG. 4 taken along line 6—6 showing a coupling and a drive ring support with its associated support bracket engaging the drive ring.

FIG. 9 is a sectional view of FIG. 4 taken along line 9—9 showing a second mount supporting the telescoping tube.

FIG. 10 is a sectional view of FIG. 4 taken along line 10—10 showing a third mount supporting the telescoping tube, a second mount supporting a second end of the auger, and a double pivoting wall wheel assembly.

FIG. 12 is an exploded, perspective view of the stationary support frame of FIG. 11.

FIG. 13 is an exploded, perspective view showing a second embodiment of the stationary support frame for a 20 to 22 foot diameter silo.

FIG. 14 is a perspective view showing the stationary support frame of FIG. 11 with high-lift legs and an on-board winch assembly.

FIG. 15 is a partial, exploded, perspective view showing a portion of the stationary support frame of FIG. 13 with high-lift legs and the on-board winch.

FIG. 16 is an elevated, cutaway view showing the automated mechanism for raising and lowering the hole former when the hole former is in its central hole forming position.

FIG. 17 is an elevated view showing the automated hole forming mechanism with the hole former in its central hole forming position when the silo unloader has been raised.

FIG. 18 is an elevated view showing the automated hole forming mechanism raised into an offset position.

DETAILED DESCRIPTION

Figure 1:
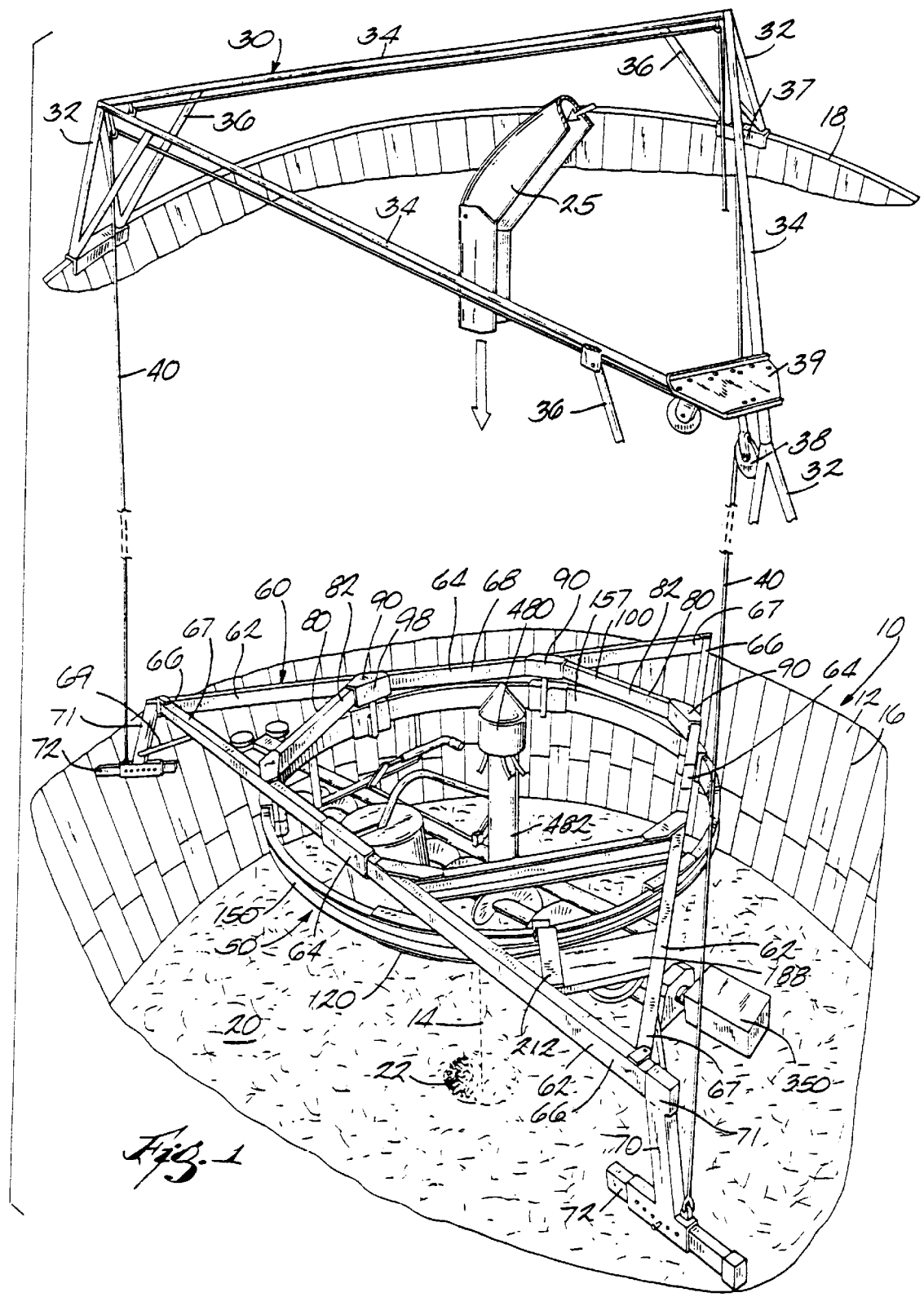
FIG. 1 is a perspective view of the rotating ring drive silo unloader suspended from a hexapod suspension in a silo with the hole former in a raised or offset position.

While this invention is susceptible of embodiments in many different forms, the drawings show and the specification describes in detail a preferred embodiment of the invention. It should be understood that the disclosure is to be considered an exemplification of the principles of the invention. It is not intended to limit the broad aspects of the invention to the embodiment illustrated.

FIGS. 1–4 show a silo 10 having a substantially cylindrical wall 12 with an interior surface 16 and a top end 18. The silo has a center or center line denoted by reference number 14. Silage 20 partially fills the silo 10 to a top layer. A hole 22 is formed in the center 14 of the silage 20. The silage 20 enters the silo via a fill chute 25 which is positioned to distribute the silage over the center 14 of the silo 10. A preferred embodiment of the rotating ring drive silo unloader is denoted by reference number 50. During the loading process, the silo unloader 50 distributes the silage 20 evenly over its top layer. During the unloading process, the silo unloader 50 removes the top layer of silage 20, draws it toward the center 14 of the silo 10, and discharges it through the hole 22 to the bottom of the silo.

A commercially available hexapod suspension pod 30 is mounted to the top end 18 of the silo 10 as shown in FIG. 1. The hexapod 30 includes three sets of risers 32. Each riser comprises two upwardly projecting legs spaced apart at their base ends and joined together at their top ends. The hexapod 30 includes three main suspension arms 34 joined together in a triangular shape. Each riser 32 supports a corner of the triangle formed by one end of two separate main suspension arms 34. A brace 36 connects each of the main suspension arms 34 to a base plate 37 of each of the risers 32. The base plate 37 joins the base ends of the legs of its respective riser 32, and mounts the riser to the top end 18 of the silo wall 12. The main suspension arms 34 form an equilateral triangle that is substantially horizontally aligned in the silo 10. The hexapod suspension includes three sheaves 38. Each sheave 38 is located proximal one of the risers 32 near the silo wall 12. A stiffening plate 39 is located near the main riser or main leg. A separate cable 40 is trained over each of the sheaves 38 to raise and lower the silo unloader 50. The three cables 40 may be joined to form a 3 to 1 cable system (not shown) for raising and lowing the silo unloader 50 via an external winch assembly (not shown) that is mounted on the outside surface of the silo wall 12. While the silo unloader 50 is shown and described to be supported by cables 40, it would be obvious to one of ordinary skill in the art to substitute chains, ropes, etc. for the cables.

The silo unloader 50 includes a substantially stationary support frame 60 having three main support members 62. Each main support member 62 includes a middle portion 64, and first and second ends 66 and 67. The middle portion 64 of each main support member 62 has a rectangular cross-sectional shape. As best shown in FIGS. 12 and 13, the first and second ends 66 and 67 are preferably channels having inwardly facing U-shaped cross-sectional shapes. Each end 66 and 67 has a tubular portion 66a or 67a at its inner end. The tubular portions 66a and 67a form the middle portion 64. The first and second ends 66 and 67 are rigidly fixed to their respective middle portion 64 by a solid connector. The middle portion 64 formed by tubular ends 66a and 67a have an interior surface 68. The three main support members 62 form a triangular configuration that is of substantially the same size as the triangle formed by the main suspension arms 34 of the hexapod suspension 30. The triangle formed by the main support members 62 is substantially horizontally aligned in the silo. While the support frame 60 is referred to as being "substantially stationary" or "substantially rotationally stattionary," it should be understood that the support frame is selectively raised and lowered in the silo 10 by the cables 40, and that the support frame may rotate a small amount about the center 14 of the silo given that the support frame is slightly smaller in overall size than the diameter of the silo wall 12. This smaller overall size helps prevent the support frame 60 from binding against the silo wall 12 when it is raised or lowered in the silo 10.

Figure 11:
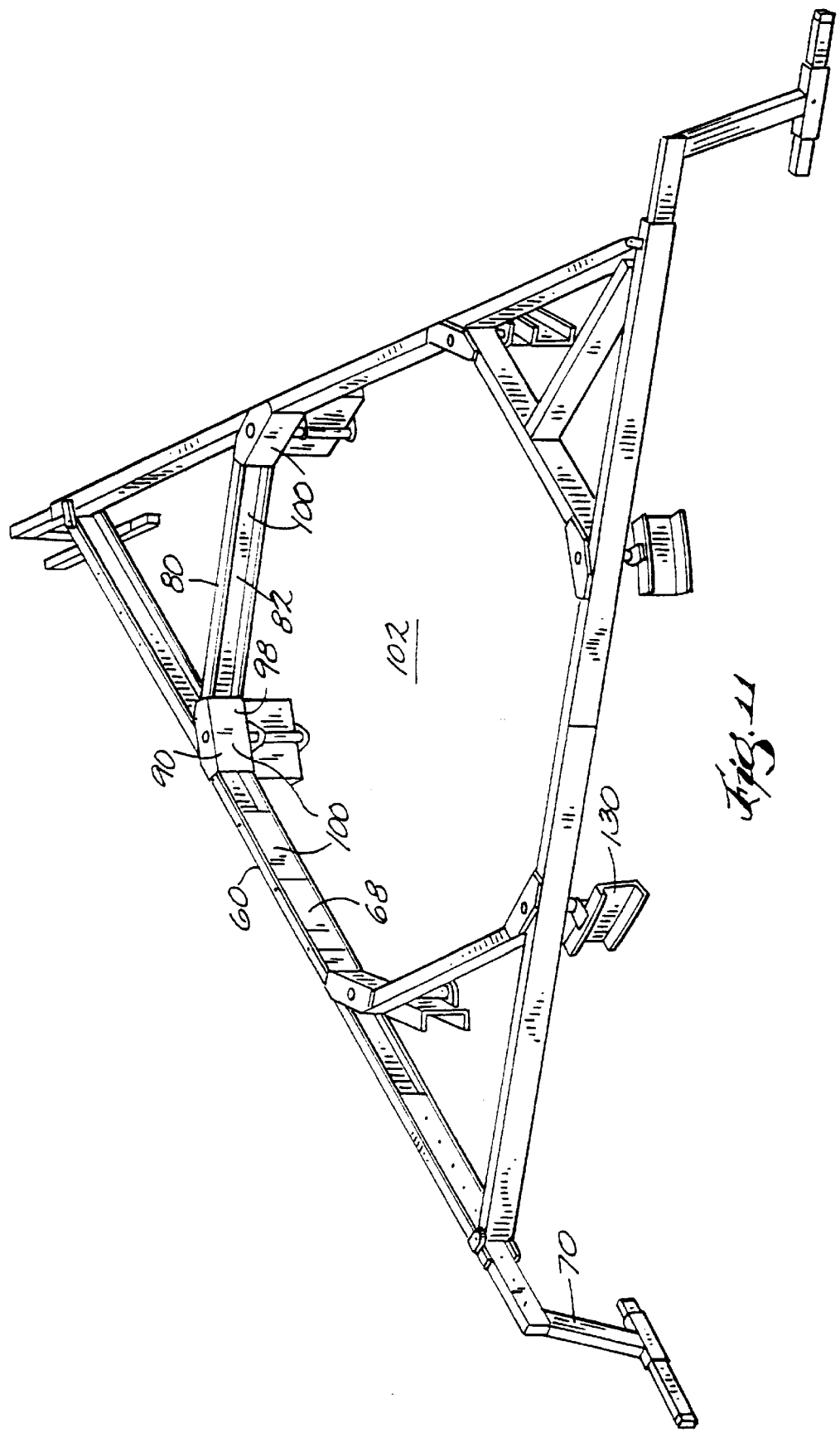
FIG. 11 is a perspective view showing a first embodiment of the stationary support frame for a 24 to 28 foot diameter silo.
Figure 19:
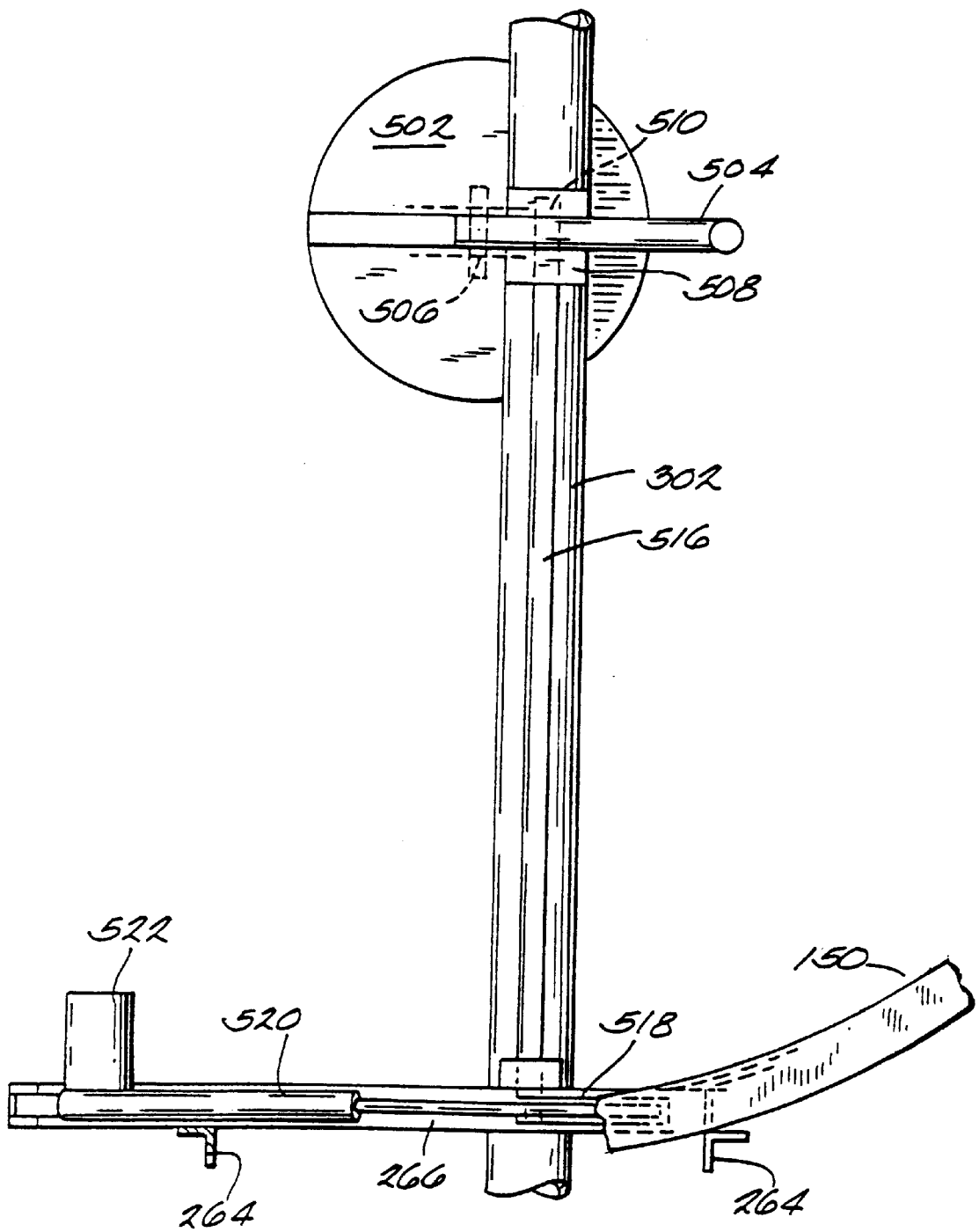
FIG. 19 is a top cutaway view showing the automated hole forming mechanism with the hole former and its central hole forming position, and the linear actuator secured to the second mount for the telescoping tube.

FIGS. 11 and 12 show the support frame 60 for a silo unloader intended for a 24 to 28 foot diameter silo 10. The support frame 60 has high-lift legs 70 secured directly to the first end 66 of each main support member 62. The high-lift legs 70 include telescoping arms or extendible members 71 and 72, and an offset leg 73. The extendible members 71 and 72 can be extended or retracted to accommodate a range of silo diameters or warpage in the silo wall 12. Arm 72 has a bumper 74 at its distal end for engaging the interior surface 16 of the silo wall 12 to help prevent rotation of the stationary support frame 60 during use. The upper telescoping member 71 is sized to be matingly received by the first end 66 of main support member. The lower telescoping member 72 is sized to be matingly received in a horizontal, tubular portion of offset leg 73. The telescoping members 71 and 72 are extended to accommodate the particular diameter and shape of a given silo 10. The second end 67 of each main support member 62 is secured near the first end 66 of an adjacent support member. A brace 69 joins, each high-lift leg 70 of one main support member 62 with the second end 67 of its adjacent main support member. As shown in FIG. 1, the main support members 62 of the stationary support frame 60 are aligned substantially directly beneath the main suspension arms 34 of the hexapod suspension 30. Similarly, the corners of the triangle formed by the main support members 62 are aligned substantially directly beneath the corners of the triangle formed by the main suspension arms 34 of the hexapod suspension 30.

FIGS. 13 and 15 show the support frame 60 for a silo unloader intended for a 20 to 22 foot diameter silo 10. The support frame 60 has main support members 62 with shorter first and second ends 66 and 67 so that adjacent ends do not directly connect to each other. Upper and lower brackets 76 and 77 join adjacent ends 66 and 67 together. A sleeve 78 is secured between upper and lower brackets 76 and 77 for receiving the upper telescoping member 71 of the high-lift leg 70. In spite of the shortening of the first and second ends 66 and 67, the three main support members 62 form a partial triangular configuration that is of substantially the same size as the triangular configuration formed by the main suspension arms 34 of the hexapod suspension 30.

The stationary support frame 60 includes three braces 80 as shown in FIGS. 11–15. Each brace 80 has one end secured between the middle 64 and an end 66 or 67 of one main support member 62, and another end secured between the middle and an end of an adjacent main support member. A coupling 90 is used to form the connection between the end of each brace 80 and the main support member 62. Each brace 80 has an interior surface 82. As best shown in FIGS. 5, 6, 12 and 13, each coupling 90 has a middle web 92, an upper flange 94, and a lower flange 96. The middle web 92 includes an interior surface 98. The interior surfaces 68, 82 and 98 of the main support members, braces, and couplings, form an interior perimeter 100 of the stationary support frame 60. The interior perimeter 100 forms or delineates an open central area 102 through which silage 20 can pass in a substantial unobstructed manner.

An on-board winch assembly 45 can be included as in FIGS. 14 and 15. The on-board winch assembly 45 includes a hoist with a drum 46 secured to one of the braces 80 of the stationary support frame 60. The winch assembly 45 also includes a pulley system having a number of sheaves 47 and 75 for guiding the cables 40 from the hexapod suspension 30 to the drum 46 of the hoist. The pulley system includes directional sheaves 47 positioned to guide the cables 40 from the end and along the length of the main support members 62 to the drum 46. The directional sheaves 47 are secured to the main support members 62 or an additional mounting plate 48. When the support frame 60 includes high-lift legs 70, the pulley system includes several sets of upper and lower sheaves 75 secured to the upper and lower ends or brackets of each high-lift leg 70. The upper and lower sheaves 75 are position to guide the cables 40 along the contours of the high-lift legs 70. A clean-off brush (not shown) may be located just prior to the drum 46 of the hoist. The on-board winch assembly 45 is used to receive and deploy the cables 40 to and from the drum to raise and lower the silo unloader 50 in the silo 10. Each cable 40 is deployed near an end 66 of one of the main support members 62. Although the on-board winch assembly 45 can be used in conjunction with a hexapod suspension 30, it should be understood that the on-board winch assembly can also be used without a hexapod suspension by anchoring the cables 40 to the interior surface 16 near the top end 18 of the silo wall 12.

As best shown in FIGS. 5 and 6, a separate drive ring support 120 is suspended from each of the six couplings 90. Each drive ring support 120 includes a mounting tube 122 having a first end 124 and a second end 126. The first end 124 of each mounting tube 122 is rigidly secured to the interior surface 98 of each coupling 90. Upper and lower mounting plates 128 and 129 are rigidly secured to and project outwardly from a support bracket 130. Each support bracket 130 is formed by a U-shaped channel having a middle web 132, an upper flange 134 and a lower flange 135. The upper flange 134 is rigidly secured to the upper mounting plate 128, and the lower flange 135 is rigidly secured to the lower mounting plate 129. The middle web 132 has an arcuate shape with a radius similar to that of the drive ring 150. Upper and lower plates 128 and 129 have a hole for pivotally securing the bracket 130 to the second end 26 of mounting tube 122. Upper and lower pins are used to hold plates 128 and 129 and bracket 130 in place.

Upper and lower friction reducing liners 140 are bolted inside each U-shaped support bracket 130. Each friction reducing liner 140 is L-shaped and sized to be matingly received inside its respective bracket 130. Each friction reducing liner 140 can be formed by two separate pieces of friction reducing material. Each friction reducing liner 140 includes a middle portion 142, an upper portion 144 or a lower portion 145. The middle portion 142 is secured against the middle web 132 of the support bracket 130. The lower portion 145 of the lower liner 140 abuts the lower flange 135 of the support bracket 130. The upper portion 144 of the upper liner 140 abuts the upper flange 134 of the support bracket 130.

Figure 2:
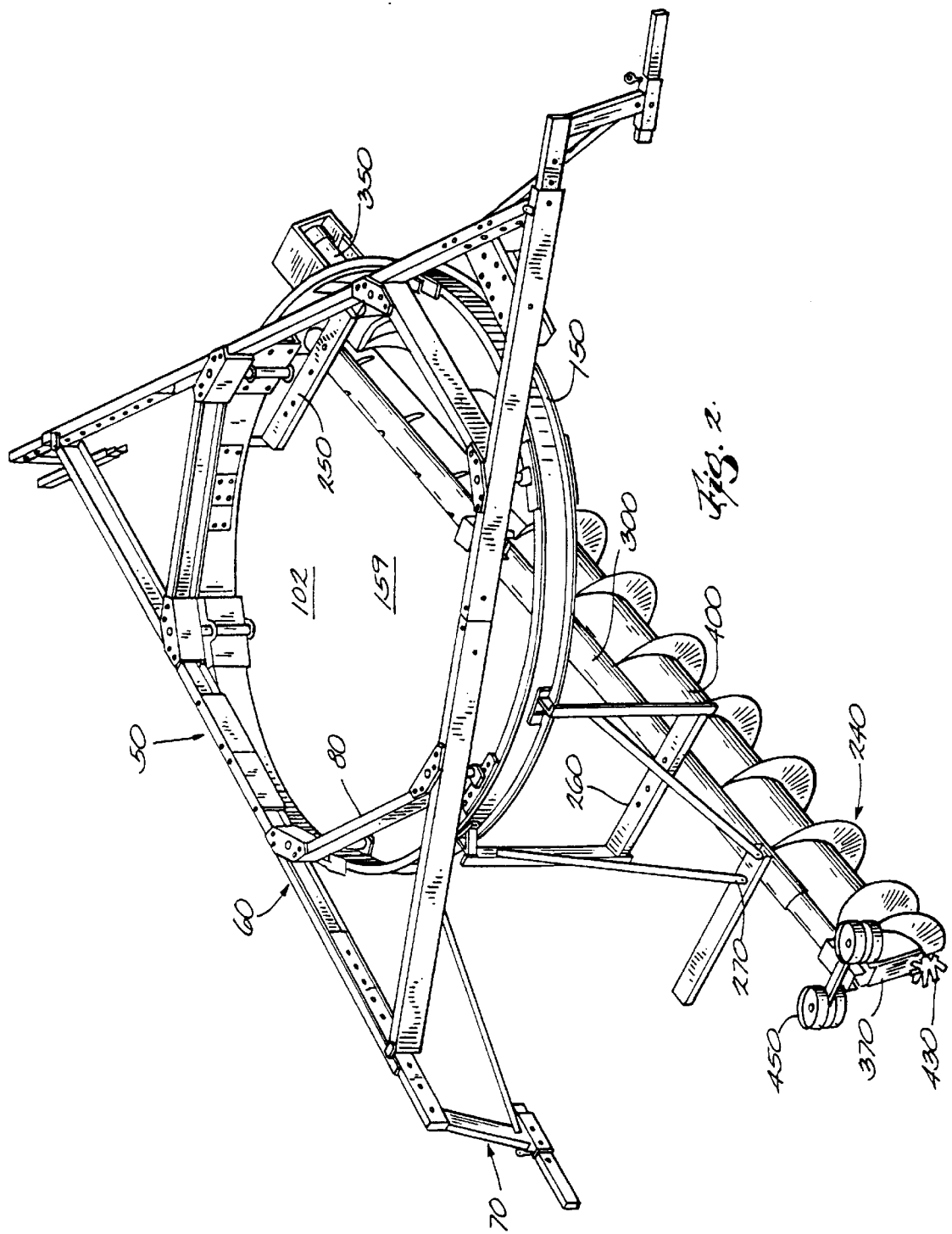
FIG. 2 is a perspective view of the silo unloader having a stationary support frame, a rotating drive ring, a telescoping tubular support and an auger.

The drive ring 150 rests on the lower portion 145 of the friction reducing liner 140 inside each support bracket 130. The drive ring 150 is formed by an outwardly facing U-shaped channel having a middle web 152 with an out surface 153, an upper flange 154 and a lower flange 155 projecting from the outer surface 153. The middle web 152 of the drive ring 150 has an interior surface 156. The interior surface 156 of the drive ring 150 combines with other components such as the drive ring supports 120 and support brackets 130 to form an interior periphery 157 of the drive ring. The inside surface 156 of the drive ring 150 forms the majority of the interior periphery 157. The interior periphery 157 forms or delineates an open middle area 159 through which silage 20 can pass in a substantially unobstructed manner. The drive ring 150 has a normal axis 158 about which it rotates via sliding engagement with friction liner 140. The normal axis 158 passes through the open middle area 159 delineated by the interior surface 156 of the drive ring 150. The drive ring 150 is aligned in substantially horizontal relationship to the stationary support frame 60, and the open middle area 159 of the drive ring is aligned substantially directly beneath the open central area 102 of the stationary support frame. As best shown in FIG. 2, the ring 150 may be divided into several segments and joined together via splicing plates. The drive ring 150 also includes a number of gripping fingers 160 shown in FIG. 8 for gripping a drive chain 200 as discussed below. The drive ring 150 is formed from a seven gauge steel channel with a middle web 152 having a height of nine inches, and upper and lower flanges 154 and 155 having a length of one and three quarter inches. The inside diameter of the ring on a 20 to 28 foot unloader is ten feet ten inches. The inside diameter of the ring of a 30 foot unloader is sixteen feet six inches.

A drive ring motor 180 is suspended from support frames 60. The drive ring motor 180 includes a gear box 182 and a drive shaft 184. A sprocket 186 is secured to the end of the drive shaft 184. The motor 180 and gear box 182 are secured to a platform 188 mounted to a portion of the support frame 60 located outside of the interior perimeter 100 and open central area 102. The drive ring motor 180 is one half horse power. The gear box 182 has a 500 to 1 gear reduction ratio with an oil level sight glass, a one inch diameter output shaft, cast iron construction, and double oil seals on input and output shafts. The sprocket is sized to accommodate seventeen teeth. As shown in FIG. 15, the platform 188 for the drive ring motor 180 also serves as the lower bracket 77 of the high-lift leg assembly on 20 to 22 foot silo unloaders.

The chain 200 forms a loop that engages the exterior surface of the middle web portion 152 of drive ring 150. The chain loop 200 is of sufficient length to encompass the outer surface 153 of the drive ring 150 and engage the sprocket 186 of the drive ring motor 180. The chain 200 is formed by a plurality of links 202 having open interiors 204. The chain 200 is preferably a CA550 implement roller chain, having an average ultimate strength of 11,250 pounds pull. The drive ring motor 180 turns sprocket 186 to move the chain 200 in a clockwise path of travel 205 as shown in FIG. 4. The open interior 204 of the chain links 202 engage the gripping fingers 160 of the drive ring 150. This engagement transmits the force necessary to move the drive ring in the path of travel 205 of the chain 200, thereby rotating the drive ring around its normal axis 158.

Figure 3:
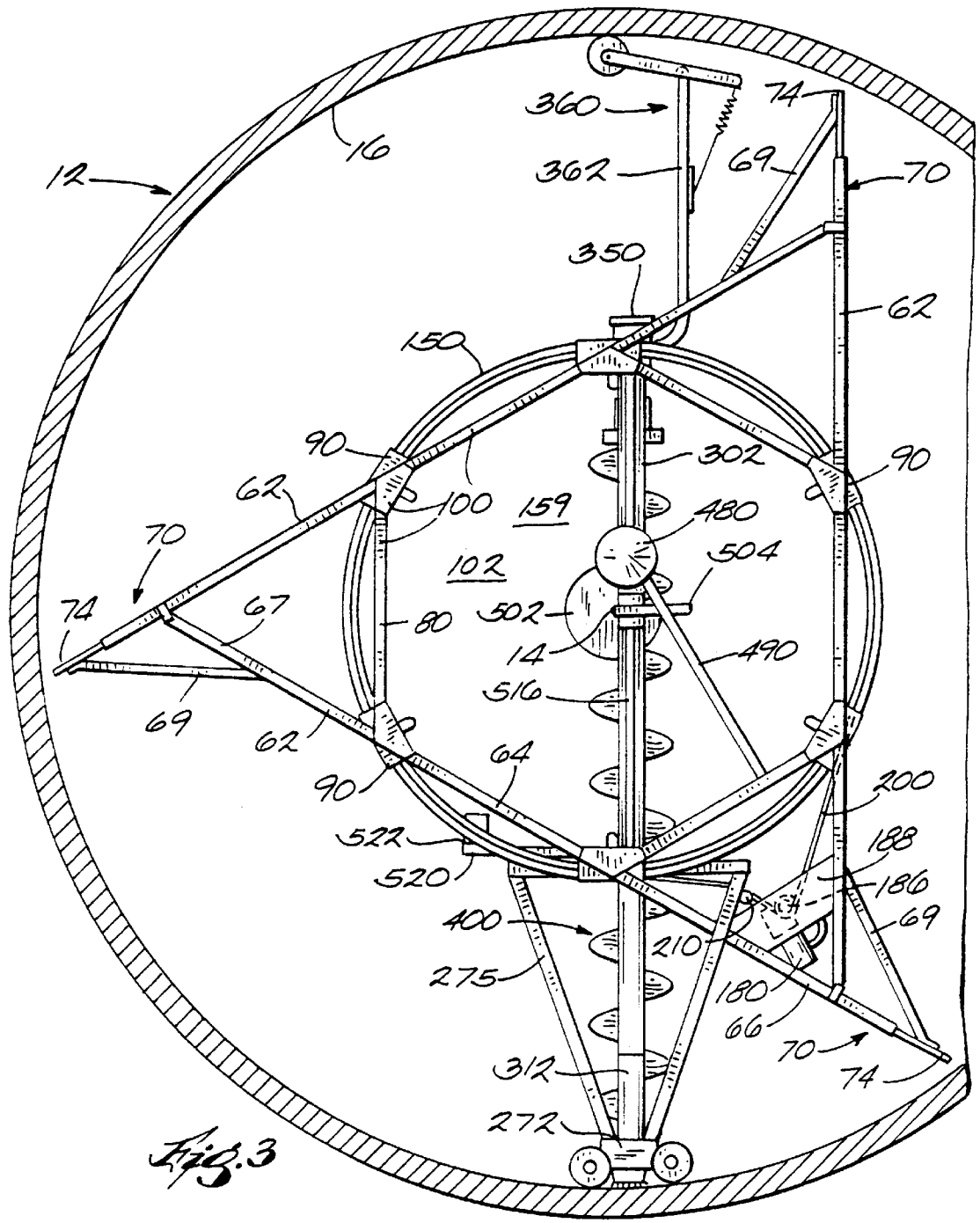
FIG. 3 is a top view of the rotating ring drive silo unloader in a silo with the hole former in a central hole forming position.
Figure 8:
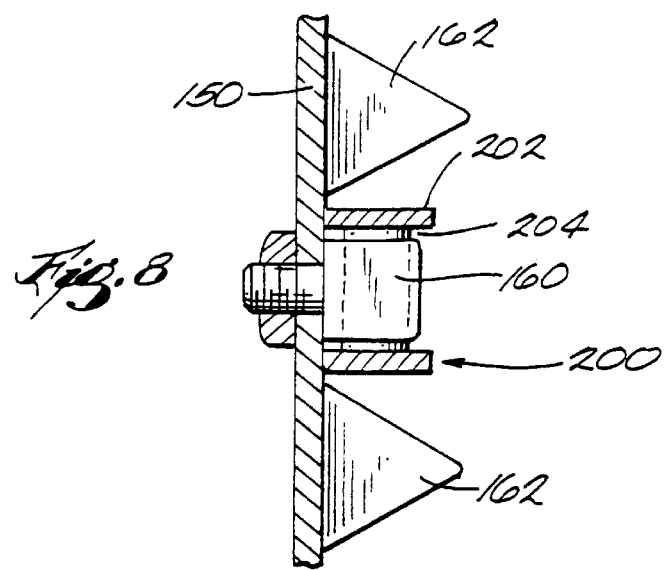
FIG. 8 is a side view showing a gripping finger projecting from the exterior surface of the rotating drive ring and engaging a link in the chain of the chain loop drive system.

As best shown in FIG. 3, a compression spring and roller type chain tightener 210 is provided to provide tension to and eliminate slack from the chain 200. The chain tightener 210 is supported from platform 212 as shown in FIG. 1. A pair of cone shaped guides 162 are rigidly secured to the drive ring for guiding the chain 200 into engagement with the gripping fingers 160 of the drive ring 150 as shown in FIGS. 8 and 9. One guide 162 is positioned above and one guide is positioned below the gripping fingers 160.

Figure 7:
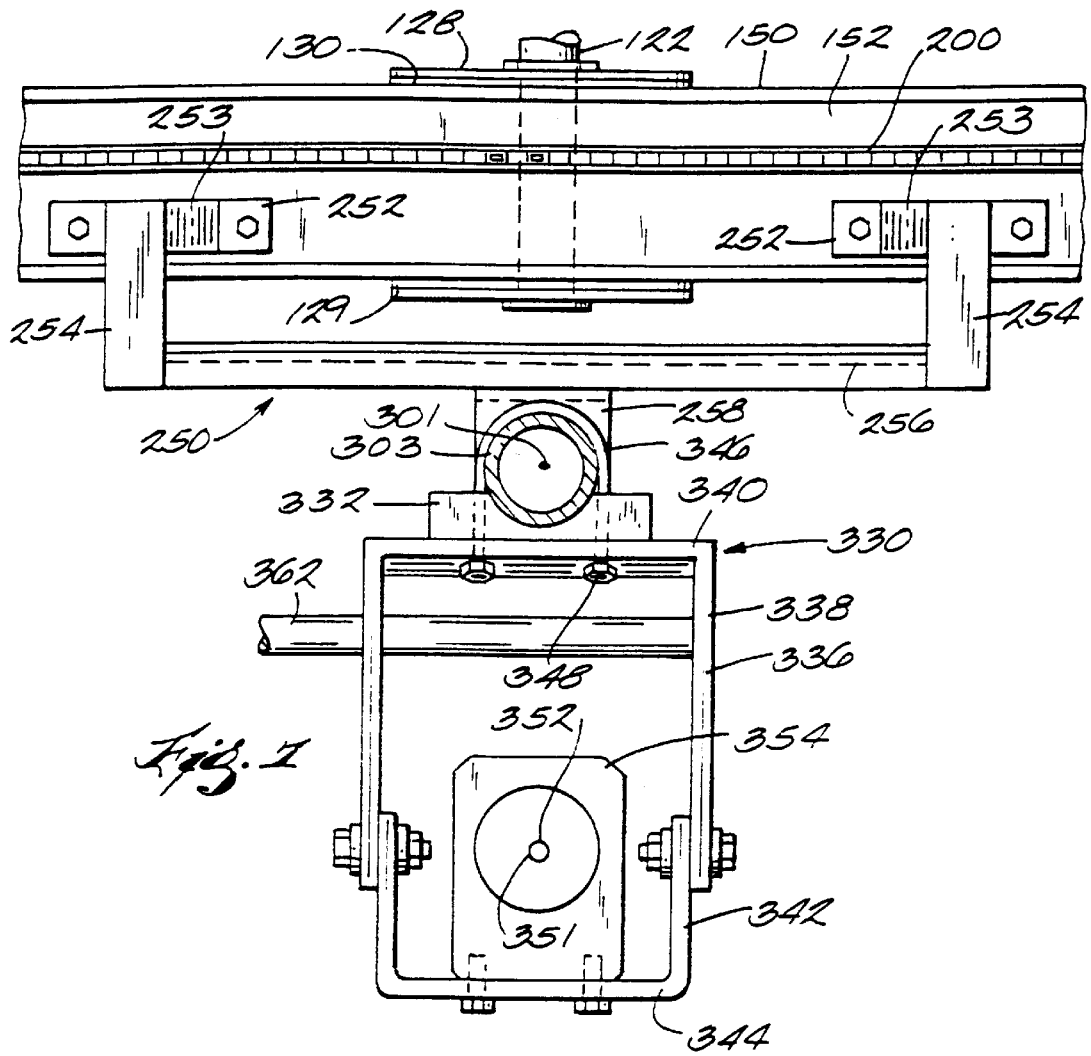
FIG. 7 is a sectional view of FIG. 4 taken along line 7—7 showing the rotating drive ring, a first mount supporting the telescoping tube and a first mount supporting one end of the auger.

The rotating ring drive silo unloader 50 supports a gathering mechanism 240 having a gathering mechanism support frame 245 as shown in FIG. 4. The support frame 245 includes first, second and third tube mounts 250, 260 and 270 for supporting a telescoping tubular support 300. FIG. 7 shows the first tube mount 250 secured to the exterior surface of the middle web 152 of the rotating drive ring 150. The first mount 250 includes two spaced apart brackets 252 secured to the drive ring 150. Each bracket includes an outwardly extending portion 253 and a downwardly extending portion 254. The downwardly extending portions 254 are joined by a channel 256. Mounting plates 258 are secured to the middle of channel 256.

FIG. 9 shows the second tube mount 260 secured to the rotating drive ring 150. The second tube mount 260 is positioned diametrically opposite from the first tube mount 250. Again, the second tube mount is secured to the exterior surface of middle web 152. The second tube mount 260 includes two spaced apart brackets 262. Each bracket 262 includes an outwardly extending portion 263 and a downwardly extending portion 264. The downwardly extending portions 264 are joined by a channel 266. Mounting plates 268 are secured to the middle portion of channel 266.

FIG. 10 shows a third tube mount supporting the telescoping tubular support 300. The third tube mount 270 includes a mounting bracket 272 secured to the tubular support 300. A pair of end braces 275 join bracket 272 to the downwardly extending portions 264 of second tube mount 260.

Telescoping tubular support or main tubular support 300 is comprised of a fixed tubular member 302 and a telescoping tubular member 312. The fixed tube 302 has an outside diameter of about six inches. The telescoping tube 312 has an outside diameter of about five and a half inches. The fixed tubular member 302 includes a first end 303, a second end 304 and an exterior surface 307. The telescoping tubular member 312 includes a first end 314, a second end 316 and an exterior surface 318. The first end 314 of the telescoping tubular member 312 is matingly received into the second end 304 of the fixed tubular member 302. As shown in FIGS. 2 and 4, the first end 303 of the fixed tube 302 is supported by the first tube mount 250. The middle of fixed tube 302 is supported by the second tube mount 260. The second end 304 of fixed tube 302 is supported by third tube mount 270. The telescoping tubular member 312 is cantilevered from and supported by the second end 304 of the fixed tubular member 302. However, it should be understood that it is possible to support the telescoping tubular portion 312 by the third tube mount 270 as shown in FIG. 3. In this embodiment, the third tube mount 270 is positioned at the second end 316 of the telescoping tubular portion 312. The telescoping tubular support 300 is pitched a predetermined angle of about six degrees 320 so that the first end 303 of the tubular support is above the second end 316. This is accomplished by lengthening the downwardly extending portions 264 of second tube mount 260 and the end braces 275 of the third tube mount 270.

An auger support frame including first and second auger mounts 330 and 370 is used to rotatably support auger 400. As shown in FIG. 7, the first auger mount 330 is located substantially directly beneath the first tube mount 250. The first auger mount 330 includes a plate 332 clamped to the lower side of the first end 303 of tubular support 300. A motor support frame 336 abuts plate 332. The motor support frame 336 includes an upper portion 338 with an upper plate 340, and a lower portion 342 with a lower plate 344. The upper and lower portions 338 and 342 are pivotally joined to allow adjustment of auger motor 350. A clamp or U-bolt 346 is secured around the first end 303 of tubular support 300 with its legs extending through plate 332 and the upper plate 340 of motor support frame 336. Locking nuts 348 securely fasten the motor support frame 336 to the tubular support 300. The locking nuts 348 can be loosened to release the clamping engagement of mount 330 and plate 332 to the first end 303 of the fixed tubular support 302.

As best shown in FIGS. 4 and 7, the auger motor 350 is secured inside motor support frame 336. The auger motor 350 includes a drive shaft 351 and gear box 354. The gear box is fastened to the lower plate 344 of motor support frame 336. Auger motor 350 is preferably a ten horse power "C" face motor. The motor 350 is directly coupled to the 16 to 1 ratio in line helical gear box 354. The gear box 354 is directly coupled to the auger by 4 five-eighths inch diameter bolts. The output shaft 352 of the gear box 354 is preferably one and three quarter inches in diameter. A pressure wheel 360 may be secured to the first auger mount 330 as shown in FIG. 3. This is accomplished by securing a pressure wheel support 362 to the upper portion 338 of motor support frame 336 as shown in FIG. 7.

Second auger mount 370 is best shown in FIG. 10. Second auger mount 370 is formed by a mounting bracket 372 welded to the lower exterior portion of telescoping tubular member 312 near end 304. A bearing support flange 374 is bolted to mounting bracket 372. Bearing support flange 374 supports a bearing (not shown) that supports auger 400. The bearing is preferably a one and three-eighths inch diameter greasable sleeve bearing.

As shown in FIGS. 4 and 10, auger 400 includes a tubular auger shaft 402 having a longitudinal axis 403 about which the auger rotates. The auger 400 has a first end 404, a second end 406 and an exterior surface 407. The first end 404 of auger 400 is secured to the drive shaft 352 of the gear box 354 of auger motor 350. The second end 406 of auger 400 includes a mounting shaft (not shown). The mounting shaft is secured in the bearing supported by bearing support flange 374. The auger mounts 330 and 370 support the ends of the auger 400 about the same distance from the telescoping tubular support 300 so that the auger shaft 402 is substantially parallel to the tubular support 300. Accordingly, the auger 400 is also pitched downwardly a predetermined angle of about six degrees so that the first end 404 of the auger is above the second end 406.

The auger has helical flighting 410 for moving the silage relative to the center 14 of the silo 10. The auger flighting 410 may include auger knives (not shown) made of ten gauge 1045 hardened steel. The auger has a total diameter of twenty inches. Auger shaft 402 has a diameter of six inches on 20 to 30 foot diameter silos. Sectional helical flighting 410 is one quarter inch thick near the silo wall 12, and five sixteenths inch thick helicoid flighting for the remainder of the auger. It should be noted that auger mounts 330 and 370 may be constructed to offset the longitudinal axis 403 of the auger shaft 402 in front of the longitudinal axis 301 of the tubular support 300. This offset positions the auger 400 in front of the tubular support 300, and prevents the tubular support from coming in contact with the silage 20 before the auger as the gathering mechanism 240 rotates clockwise around the normal axis 158 of the drive ring 150. As shown in FIGS. 2–4, chipper wheel 430 is secured to the second end 406 of auger 400. Chipper wheel 430 includes six blades 432. The chipper wheel 430 has a ten inch diameter and is mounted on a one and three eighths inch diameter shaft.

As best shown in FIGS. 2, 4 and 10, a double pivoting wall wheel assembly 450 is mounted to the second end 316 of telescoping tubular member 312. A mounting bracket 452 is welded to the upper exterior surface of second end 316. A pivot bar 454 is secured to mounting bracket 452. Pivot bar 454 includes a middle 455, a first end 456 and a second end 457. The middle portion 455 is pivotally secured to the mounting bracket 452 via a pivot pin 458. A right pivot block 460 is pivotally secured to the first end 456 of pivot bar 454. A left pivot block 462 is pivotally secured to the second end 457. Wall wheels 465 and 466 are located on opposed sides of and rotatably secured to right pivot block 460 via an axle. Wall wheels 467 and 468 are located on opposite sides of and rotatably secured to left pivot block 462 via an separate axle.

As shown in FIGS. 1–4, a collector ring 480 is secured to fixed tubular member 302. The collector ring 480 is mounted atop a tower 482 which is bolted to fixed tubular member 302 of the main tubular support 300. The collector ring 480 is surrounded by a housing 484 having a cone shaped hood. The collector ring 480 is offset from the center 14 of silo 10 a distance of about nine inches to permit a more even distribution of the silage 20 during filling of the silo. The collector ring 480 is positioned at an elevation approximately even with the main support members 62 of the stationary support frame 60. The collector ring 480 is further supported by telescoping support 490. One end of the telescoping support 490 is secured to a brace 80 of stationary support frame 60. Electrical power is received by the collector ring 480 from non-rotating electrical input line 492. Electrical power is transmitted to the auger motor 350 via electrical output line 494. Although the collector ring 480 is shown and described to be mounted atop the tower 482, it should be understood that the collector ring can take the form of a conductive ring (not shown) attached to and extending around the drive ring 150. Electrical power could then be supplied to the auger motor 350 via electrical contacts mounted on the drive ring supports 120.

As shown in FIGS. 16–19, the silo unloader 50 includes a hole forming assembly 500. This assembly includes hole former 502 which is secured to one end of a rotating arm 504. Rotating arm 504 is robustly sized to support hole former 502 and is arcuately shaped to avoid contacting or interfering with the auger 400. The hole former 502 is secured to rotating arm 504 by first pivoting joint 506. The opposite end of rotating arm 504 is secured to the upper portion of fixed tubular member 302 via mount 508. Rotating arm 504 is secured to a spacing axle 516 via a second pivoting joint 510. Spacing axle 516 is secured to a torque arm 518. A ball screw linear actuator 520 engages torque arm 518 such that electric motor 522 can cause rotation of torque arm 518 and spacing axle 516. Rotation of spacing axle 516 in turn causes rotating arm 504 and hole former 502 to move along a path of travel 515 from a central hole forming position 512 to an offset position 514. Pivoting joints 506 and 510 enable the hole former 502 to hang substantially vertically when in the hole forming and offset positions 512 and 514.

While the invention has been described with reference to a preferred embodiment, it will be understood by those skilled in the art that various changes may be made and equivalents may be substituted without departing from the broader aspects of the invention.

I claim:

1. A ring drive silo unloader for loading and unloading silage into and out of a silo, the silo having a substantially cylindrical wall with a center, an inside surface and a top end, the silo unloader comprising:

a plurality of cables for suspending the ring drive silo unloader in the silo;

a substantially rotationally stationary support frame supported by the cables, and having an interior perimeter that delineates art open central area through which the silage may pass in a substantially unobstructed manner when loading silage into the silo;

a rotating drive ring having a normal axis, and being totatably supported by the support frame to permit rotation of the drive ring about the normal axis in a predetermined direction;

a drive mechanism that rotates the drive ring about the normal axis relative to the support frame; and a gathering mechanism supported from the rotating drive ring that moves the silage relative to the center of the silo, the gathering mechanism including an auger having a longitudinal axis and rotatable about the longitudinal axis.

2. The ring drive silo unloader of claim 1, wherein the drive ring has an interior periphery that substantially delineates an open middle area, that is aligned substantially directly beneath the open central area of the support frame.

3. The ring drive silo unloader of claim 2, wherein the support frame includes a plurality of main support members, each main support member having a middle portion and first and second ends, the first end of each main support member being secured near the second end of the adjacent main support member, and the support frame forming a substantially triangular shape.

4. The ring drive silo unloader of claim 3, wherein each of the main support members includes a plurality of drive ring supports adapted to support and allow sliding engagement with the drive ring to permit rotation of the drive ring in the predetermined direction.

5. The ring drive silo unloader of claim 4, wherein two of the drive ring supports are secured to each of the main support members, and spaced apart and located proximal to the middle portion of their respective main support member.

6. The ring drive silo unloader of claim 3, wherein the gathering mechanism is positioned below the drive ring.

7. The ring drive silo unloader of claim 6, wherein the gathering mechanism further includes an auger support frame, and the auger is rotatably supported by the auger support frame to permit rotation of the auger about the longitudinal axis.

8. The ring drive silo unloader of claim 1, further comprising a hole forming assembly secured to the main tubular support of the auger support frame, the hole forming assembly having a hole former that forms a hole in the silage during unloading of the silage, and adapted to allow silage to pass through the hole during unloading.

9. The ring drive silo unloader of claim 1, further comprising a suspension pod positioned at the top end of the wall of the silo, the suspension pod adapted to support a plurality of sheaves, each of the sheaves supporting one of the cables.

10. The ring drive silo unloader of claim 9, wherein the suspension pod has a plurality of main suspension arms joined together to form corners, and the support frame has a plurality of main support members, each being aligned substantially directly beneath one of the main suspension arms and joined together to form corners with the corners formed by the main support members aligned substantially directly beneath the corners formed by the main suspension arms.

11. The ring drive silo unloader of claim 9, wherein the suspension pod is a hexapod suspension, and the hexapod suspension has three main suspension arms joined in the shape of a first triangle, and the stationary support frame has three main support members formed in the shape of a second triangle.

12. The ring drive silo unloader of claim 11, wherein the main suspension arms of the hexapod suspension, the main support members of the stationary support frame and the rotating drive ring are each aligned in a substantially horizontal position.

13. The ring drive silo unloader of claim 1, further comprising a wall wheel assembly having a pivot bar, first and second pivot blocks and first and second wall wheels, the pivot bar having a middle and a first and a second end, the middle being pivotally secured to the gathering mechanism, the first pivot block being pivotally secured to the first end of the pivot bar and the second pivot block being pivotally secured to the second end of the pivot bar, the first wall wheel being rotatably secured to the first pivot block and the second wall wheel being rotatably secured to the second pivot block.

14. The ring drive silo unloader of claim 13, further comprising third and fourth wall wheels, the first and third wall wheels being located on opposed sides of and rotatably secured to the first pivot block, and second and fourth wall wheels being located on opposed sides of and rotatably secured to the second pivot block.

15. The ring drive silo unloader of claim 1, further comprising an on-board winch assembly having a hoist drum that is rotatably secured to the support frame, the drum being rotated to receive and deploy said plurality of cables to raise and lower the silo unloader.

16. The ring drive silo unloader of claim 15, further comprising a pulley system having a plurality of directional sheaves, each of the directional sheaves guiding one of the cables to the drum.

17. The ring drive silo unloader of claim 16, wherein each of the cables is directed by at least one of the directional sheaves along one of the main support members, and each of the cables is deployed near an end of one of the main support members.

18. The ring drive silo unloader of claim 17, wherein each of the main support members includes a downwardly projecting high-lift leg having upper and lower ends, and the pulley system includes a plurality of sets of upper and lower sheaves, each set of upper and lower sheaves guiding one of the cables along said downwardly projecting high-lift legs.

19. The ring drive silo unloader of claim 18, wherein the support frame includes a brace, and the hoist drum is secured to the brace.

20. A ring drive silo unloader for loading and unloading silage into and out of a silo, the silo having a substantially cylindrical wall with a center, an inside surface and a top end, the silo unloader comprising:

a plurality of cables for suspending the ring drive silo unloader in the silo;

a substantially rotationally stationary support frame supported by the plurality of cables, the support frame having an interior perimeter that delineates an open central area through which the silage may pass in a substantially unobstructed manner when loading the silage into the silo, and a plurality of main support members, each main support member having a middle portion and first and second ends, the first end of each main support member being secured near the second end of the adjacent main support member, and the support frame forming a substantially triangular shape;

a rotating drive ring having a normal axis and being rotatably supported by the support frame to permit rotation of the drive ring about the normal axis in a predetermined direction, and having an interior periphery that substantially delineates an open middle area, the open middle area being aligned substantially directly beneath the open central area of the support frame;

a drive mechanism that rotates the drive ring about the normal axis relative to the support frame;

a gathering mechanism that moves the silage relative to the center of the silo, the gathering mechanism supported from and positioned below the rotating drive ring and including an auger and an auger support frame;

the auger having a longitudinal axis and rotatably supported by the auger support frame to permit rotation of the auger about the longitudinal axis; and the auger support frame including a main tubular support having a middle and first and second ends, the first end and the middle of the main tubular support being rigidly secured to the drive ring, and the first and second ends of the main tubular support being adapted to rotatably support the auger.

21. The ring drive silo unloader of claim 20, wherein the auger is positioned substantially directly beneath the main tubular support of the auger support frame, and the middle of the main tubular support is positioned beneath the open central area and the open middle area.

22. A ring drive silo unloader for loading and unloading silage into and out of a silo, the silo having a substantially cylindrical wall with a center, an inside surface and a top end, the silo unloader comprising:

a plurality of cables for suspending the ring drive silo unloader in the silo;

a substantially rotationally stationary support frame supported by the plurality of cables;

a rotating drive ring having an outer surface and a normal axis, and being rotatably supported by the support frame to permit rotation of the drive ring about the normal axis, the outer surface of the drive ring including a plurality of gripping fingers;

a drive mechanism for rotating the drive ring about the normal axis relative to the support frame, the drive mechanism including a motor having a rotating drive wheel mounted to the support frame and a chain adapted to engage the gripping fingers of the drive ring, the rotating drive wheel moving the chain in a predetermined direction to rotate the drive ring about the normal axis in the predetermined direction, wherein the support frame includes a plurality of drive ring supports adapted to support and allow sliding engagement with the drive ring to permit rotation of the drive ring in the predetermined direction; and, a gathering mechanism supported from the rotating drive ring for moving the silage relative to the center of the silo.

23. The ring drive silo unloader of claim 22, further including a chain tightener for tightening and removing slack in the chain.

24. The ring drive silo unloader of claim 22, further comprising guides for guiding the chain into engagement with the gripping fingers of the drive ring.

25. The ring drive silo unloader of claim 22, further comprising a suspension pod positioned at the top end of the wall of the silo, and adapted to support a plurality of sheaves, each of the sheaves supporting one of the cables.

26. A ring drive silo unloader for loading and unloading silage into and out of a silo, the silo having a substantially cylindrical wall with a center, silo, an inside surface and a top end, the silo unloader comprising:

a plurality of cables for suspending the ring drive silo unloader in the silo;

a substantially rotationally stationary support frame supported by the plurality of cables;

a rotating drive ring having a normal axis, and supported by the support frame to permit rotation of the drive ring about the normal axis;

a drive mechanism for rotating the drive ring about the normal axis relative to the support frame;

a gathering mechanism for moving the silage relative to the center of the silo, the gathering mechanism including an auger, auger support frame, and a motor; the auger having a shaft of a predetermined length with first and second ends, and an auger support frame that suspends the auger and permits longitudinal rotation of the auger shaft, the auger support frame including a main tubular support having first and second ends, and spanning the length of the auger shaft, the first end of the auger shaft being rotatable supported near the first end of the main tubular support, and the second end of the auger being rotatable supported near the second end of the main tubular support, the auger shaft being aligned substantially parallel to and substantially directly beneath the main tubular support; and, the motor having a drive shaft and a gear box having a drive shaft, the gear box being supported near the first end of the main tubular support, and the first end of the auger being supported by the drive shaft of the gear box.

27. The ring drive silo unloader of claim 26, wherein the tubular support and the auger are pitched at a predetermined angle, and the first end of the main tubular support and the first end of the auger are above the second end of the main tubular support and the second end of the auger.

28. The ring drive silo unloader of claim 26, wherein the drive shaft of the motor and the drive shaft of the gear box are substantially linearly aligned.

29. The ring drive silo unloader of claim 28, wherein the drive shaft of the motor is substantially linearly aligned with the auger shaft.

30. The ring drive silo unloader of claim 26, further comprising a suspension pod positioned at the top end of the wall of the silo, and adapted to support a plurality of sheaves, each of the sheaves supporting one of the cables.

31. The ring drive silo unloader of claim 26, and further comprising an on-board winch for raising and lowering the silo unloader in the silo.

32. The ring drive silo unloader of claim 26, further comprising a hole former adapted to form a hole in the center of the silage, and having a rotating arm secured to the main tubular support, the rotating arm adapted to selectively move the hole former from a central hole forming position to an offset position, and the gathering mechanism adapted to move silage into the hole when the hole former is in the offset position.

33. A bottom discharge, ring drive silo unloader for loading and unloading silage into and out of a silo having a substantially cylindrical wall with a center, an inside surface and a top end, the silo unloader comprising:

a plurality of cables suspended from the top of the silo;

a substantially rotationally stationary support frame supported by the plurality of cables;

a rotating drive ring rotatably supported by the substantially stationary support frame;

a gathering mechanism supported from the rotating drive ring, the gathering mechanism being adapted to move the silage relative to the center of the silo; and, a drive mechanism that rotates the gathering mechanism relative to the support frame; and, a hole forming assembly attached to the gathering mechanism for forming a hole in the silage, the hole forming assembly having a hole former supported by a rotating arm, the rotating arm being rotatably secured to the gathering mechanism, the rotating arm being adapted to selectively move the hole former from a central hole forming position to an offset position, the gathering mechanism being adapted to move the silage into the hole when the hole former is in the offset position.

34. The ring drive silo unloader of claim 33, wherein the hole forming assembly further includes a linear actuator and a torque arm, the torque arm being rotatably secured to the gathering mechanism, the linear actuator being adapted to rotate the torque arm, and the torque arm transmitting rotational movement to the rotating arm.

35. The ring drive silo unloader of claim 34, wherein the support frame forms an interior perimeter that delineates an open central area through which silage may pass in a substantially unobstructed manner when loading silage into the silo, and wherein the hole former and rotating arm are secured to the gathering mechanism beneath the open central area and the linear actuator is connected to and spaced apart from the rotating arm by a spacing axle, the linear actuator being offset from the open central area.

36. The ring drive silo unloader of claim 35, wherein the gathering mechanism is pitched at a predetermine angle, and the rotating arm is pivotally connected to the gathering mechanism by a first pivoting joint, and the hole former is pivotally connected to the rotating arm by a second pivoting joint, and the first and second pivoting joints permit the hole former to hang substantially vertically when in the central hole forming position.

37. A ring drive silo unloader for loading and unloading silage into and out of a silo, the silo having a substantially cylindrical wall with a center, an inside surface and a top end, the silo unloader comprising:

a plurality of cables for suspending the ring drive silo unloader in the silo;

a substantially rotationally stationary support frame supported by the plurality of cables;

a rotating drive ring having a normal axis and an open middle area, the drive ring being rotatably supported by the support frame to permit rotation of the drive ring about the normal axis;

a drive mechanism for rotating the drive ring about the normal axis relative to the support frame;

a gathering mechanism for moving the silage relative to the center of the silo, the gathering mechanism having a gathering mechanism support frame supported from the rotating drive ring, the gathering mechanism support frame including a main tubular support; and a collector ring mounted on a tower secured to the main tubular support, the tower extending through the center of the silo and middle area of the drive ring; the collector ring including a telescoping support having first and second mating members, the first member being secured to the collector ring and the second member being secured to the substantially stationary support frame, the telescoping support providing support for an electric power line to the collector ring, and the collector ring secured to the main tubular support at a location offset from the center of the silo, and positioned at an elevation approximately even with the substantially stationary support frame.

38. A ring drive silo unloader for loading and unloading silage into and out of a silo, the silo having a substantially cylindrical wall with a center, an inside surface and a top end, the silo unloader comprising:

a plurality of cables for suspending the ring drive silo unloader in the silo;

a substantially rotationally stationary support frame supported by the plurality of cables;

a rotating drive ring having a normal axis, the drive ring being rotatably supported by the stationary support frame to permit rotation of the drive ring about the normal axis;

a drive mechanism for rotating the drive ring about the normal axis relative to the support frame;

a gathering mechanism having an auger and an auger support frame with a telescoping main support, the auger having a shaft with a longitudinal axis, first and second ends and a middle portion extending through the center of the silo, the telescoping main support having a fixed member and a telescoping member, each of the members having first and second ends, the first and second ends of the fixed member being rigidly secured to the rotating drive ring, the first end of the telescoping member being adapted to telescopingly engage the second end of the fixed member, the first end of the shaft of the auger being releasably secured to the first end of the fixed member, the second end of the shaft of the auger being rigidly secured to the telescoping member, the releasable securement permitting the telescoping member and the auger shaft to be selectively extended to permit the silo unloader to accommodate a range of silo diameters and warpage in the wall of the silo.

39. The ring drive silo unloader of claim 38, wherein a clamp releasably secures the auger shaft to the fixed member of the telescoping main support of the auger support frame.

40. The ring drive silo unloader of claim 39, wherein the stationary support frame includes an extendible member that can be selectively extended to accommodate a range of silo diameters and warpage in the wall of the silo.

* * * * *